(12) United States Patent
Miller, II et al.

(10) Patent No.: US 12,197,233 B2
(45) Date of Patent: Jan. 14, 2025

(54) CLOSED SURFACE FLIGHT PATTERN GENERATION FOR UNMANNED AERIAL VEHICLE (UAV) FLUX PLANE ASSESSMENT OF LARGE FACILITIES

(71) Applicant: SeekOps Inc., Austin, TX (US)

(72) Inventors: Victor Alexander Miller, II, Sonoma, CA (US); Brendan James Smith, Lakeway, TX (US); Stuart Buckingham, Austin, TX (US)

(73) Assignee: SeekOps Inc., Austin, TX (US)

( * ) Notice: Subject to any disclaimer, the term of this patent is extended or adjusted under 35 U.S.C. 154(b) by 0 days.

(21) Appl. No.: 17/766,299

(22) PCT Filed: Oct. 2, 2020

(86) PCT No.: PCT/US2020/054117
§ 371 (c)(1),
(2) Date: Apr. 4, 2022

(87) PCT Pub. No.: WO2021/067844
PCT Pub. Date: Apr. 8, 2021

(65) Prior Publication Data
US 2024/0028051 A1    Jan. 25, 2024

Related U.S. Application Data

(60) Provisional application No. 62/910,695, filed on Oct. 4, 2019.

(51) Int. Cl.
*G05D 1/00* (2024.01)
*B64U 10/14* (2023.01)
(Continued)

(52) U.S. Cl.
CPC .............. *G05D 1/101* (2013.01); *B64U 10/14* (2023.01); *G01M 3/04* (2013.01);
(Continued)

(58) Field of Classification Search
None
See application file for complete search history.

(56) References Cited

U.S. PATENT DOCUMENTS 3,780,566 A    12/1973    Smith et al.
4,135,092 A    1/1979    Milly
(Continued)

FOREIGN PATENT DOCUMENTS

AU    3401499 A    11/1999
CN    101470072 A    7/2009
(Continued)

OTHER PUBLICATIONS

IEEE Conference Paper, "Research of the high pressure jet performance of small size nozzle," ISBN :978-1-5090-1087-5, Publication Date : Oct. 1, 2016, Conference dates Oct. 10, 2016 thru Oct. 12, 2016.[retrieved from the Internet] on Sep. 1, 2023 at 4:14pm.
(Continued)

*Primary Examiner* — Jonathan M Dager
(74) *Attorney, Agent, or Firm* — Command IP LLP; Michael Zarrabian

(57) ABSTRACT

Systems, devices, and methods including a processor having addressable memory, where the processor is configured to: determine one or more flight paths for an aerial vehicle, where the determined flight path creates a continuous surface about one or more potential gas sources of a survey site receive a trace gas data from one or more trace gas sensors of the aerial vehicle of the continuous surface as the aerial vehicle flies the determined one or more flight paths; and determine based on the received trace gas data whether a gas leak is present in the received survey site and a rate of the gas leak if present in the survey site.

22 Claims, 12 Drawing Sheets

(51) Int. Cl.
  *G01M 3/04* (2006.01)
  *B64U 101/00* (2023.01)
  *B64U 101/35* (2023.01)
(52) U.S. Cl.
  CPC ...... *B64U 2101/00* (2023.01); *B64U 2101/35* (2023.01); *B64U 2201/10* (2023.01)

(56) References Cited

U.S. PATENT DOCUMENTS

| | | | |
|---|---|---|---|
| 4,233,564 A | 11/1980 | Kerbel | |
| 4,507,558 A | 3/1985 | Bonne | |
| 4,988,833 A | 1/1991 | Lai | |
| 5,047,639 A | 9/1991 | Wong | |
| 5,075,619 A | 12/1991 | Said | |
| 5,173,749 A | 12/1992 | Tell et al. | |
| 5,291,265 A | 3/1994 | Kebabian | |
| 5,317,156 A | 5/1994 | Cooper et al. | |
| 5,767,780 A | 6/1998 | Smith et al. | |
| 5,822,058 A | 10/1998 | Adler-Golden et al. | |
| 6,064,488 A | 5/2000 | Brand et al. | |
| 6,295,859 B1 * | 10/2001 | Hayden | G01N 21/3504 |
| | | | 73/30.01 |
| 6,356,350 B1 | 3/2002 | Silver et al. | |
| 6,509,566 B1 | 1/2003 | Wamsley et al. | |
| 6,549,630 B1 | 4/2003 | Bobisuthi | |
| 7,162,933 B2 | 1/2007 | Thompson et al. | |
| 7,800,751 B1 | 9/2010 | Silver et al. | |
| 7,833,480 B2 | 11/2010 | Blazewicz et al. | |
| 8,060,270 B2 * | 11/2011 | Vian | G05D 1/104 |
| | | | 348/144 |
| 8,294,899 B2 | 10/2012 | Wong | |
| 8,451,120 B2 | 5/2013 | Johnson, Jr. et al. | |
| 8,730,461 B2 * | 5/2014 | Andreussi | G01N 21/3103 |
| | | | 356/72 |
| 9,183,371 B2 | 11/2015 | Narendra et al. | |
| 9,183,731 B1 | 11/2015 | Bokhary | |
| 9,235,974 B2 | 1/2016 | Johnson, Jr. et al. | |
| 9,250,175 B1 | 2/2016 | McManus | |
| 9,494,511 B2 | 11/2016 | Wilkins | |
| 9,599,529 B1 | 3/2017 | Steele et al. | |
| 9,599,597 B1 | 3/2017 | Steele et al. | |
| 10,023,311 B2 | 7/2018 | Lai et al. | |
| 10,023,323 B1 | 7/2018 | Roberts et al. | |
| 10,031,040 B1 | 7/2018 | Smith et al. | |
| 10,126,200 B1 | 11/2018 | Steele et al. | |
| 10,268,198 B2 | 4/2019 | Mantripragada et al. | |
| 10,325,485 B1 | 6/2019 | Schuster | |
| 10,365,646 B1 | 7/2019 | Farnsworth et al. | |
| 10,429,546 B1 | 10/2019 | Ulmer | |
| 10,677,771 B2 * | 6/2020 | Dittberner | G06V 10/143 |
| 10,753,864 B2 * | 8/2020 | Kasten | G01J 3/30 |
| 10,816,458 B2 * | 10/2020 | Kasten | G01N 21/39 |
| 10,830,034 B2 | 11/2020 | Cooley et al. | |
| 10,962,437 B1 | 3/2021 | Nottrott et al. | |
| 11,105,784 B2 * | 8/2021 | Kukreja | G01N 21/27 |
| 11,112,308 B2 * | 9/2021 | Kreitinger | G01M 3/38 |
| 11,275,068 B2 * | 3/2022 | Willett | G01N 33/0032 |
| 11,299,268 B2 | 4/2022 | Christensen et al. | |
| 11,519,855 B2 | 12/2022 | Black et al. | |
| 11,557,212 B2 * | 1/2023 | Hong | G01C 21/20 |
| 11,614,430 B2 * | 3/2023 | Buckingham | G01W 1/02 |
| | | | 73/23.2 |
| 11,619,562 B2 * | 4/2023 | Leen | G01M 3/16 |
| | | | 73/40 |
| 11,710,411 B2 * | 7/2023 | Van Meeteren | G08G 5/0013 |
| | | | 701/120 |
| 11,748,866 B2 | 9/2023 | Vargas | |
| 2002/0005955 A1 | 1/2002 | Kramer et al. | |
| 2003/0160174 A1 | 8/2003 | Grant et al. | |
| 2003/0189711 A1 | 10/2003 | Orr et al. | |
| 2003/0230716 A1 | 12/2003 | Russell et al. | |
| 2004/0012787 A1 | 1/2004 | Galle et al. | |
| 2004/0017762 A1 | 1/2004 | Sogawa et al. | |
| 2004/0212804 A1 | 10/2004 | Neff et al. | |
| 2006/0015290 A1 | 1/2006 | Warburton et al. | |
| 2006/0044562 A1 | 3/2006 | Hagene et al. | |
| 2006/0232772 A1 | 10/2006 | Silver | |
| 2006/0234621 A1 | 10/2006 | Desrochers et al. | |
| 2007/0137318 A1 | 6/2007 | Desrochers et al. | |
| 2008/0169934 A1 | 7/2008 | Lang et al. | |
| 2008/0243372 A1 | 10/2008 | Bodin et al. | |
| 2009/0201507 A1 | 8/2009 | Kluczynski et al. | |
| 2009/0263286 A1 | 10/2009 | Somura et al. | |
| 2009/0326792 A1 | 12/2009 | McGrath | |
| 2010/0004798 A1 | 1/2010 | Bodin et al. | |
| 2010/0131207 A1 * | 5/2010 | Lippert | G01S 17/95 |
| | | | 702/49 |
| 2010/0140478 A1 | 6/2010 | Wilson et al. | |
| 2010/0147081 A1 | 6/2010 | Thomas | |
| 2011/0035149 A1 * | 2/2011 | McAndrew | G08G 5/006 |
| | | | 701/466 |
| 2011/0074476 A1 | 3/2011 | Heer et al. | |
| 2011/0150035 A1 | 6/2011 | Hanson et al. | |
| 2011/0164251 A1 | 7/2011 | Richter | |
| 2011/0213554 A1 * | 9/2011 | Archibald | G01V 9/007 |
| | | | 702/6 |
| 2011/0242659 A1 | 10/2011 | Eckles et al. | |
| 2011/0257944 A1 | 10/2011 | Du et al. | |
| 2012/0120397 A1 | 5/2012 | Furtaw et al. | |
| 2013/0044314 A1 | 2/2013 | Koulikov et al. | |
| 2013/0076900 A1 | 3/2013 | Mrozek et al. | |
| 2013/0208262 A1 | 8/2013 | Andreussi | |
| 2014/0172323 A1 | 6/2014 | Marino | |
| 2014/0204382 A1 * | 7/2014 | Christensen | G01N 21/3504 |
| | | | 356/402 |
| 2014/0236390 A1 | 11/2014 | Mohamadi | |
| 2014/0336957 A1 | 11/2014 | Hanson et al. | |
| 2015/0072633 A1 | 3/2015 | Massarella et al. | |
| 2015/0145954 A1 * | 5/2015 | Pulleti | H04N 5/33 |
| | | | 348/46 |
| 2015/0226575 A1 | 8/2015 | Rambo | |
| 2015/0275114 A1 | 10/2015 | Tumiatti et al. | |
| 2015/0295543 A1 | 10/2015 | Brown et al. | |
| 2015/0316473 A1 | 11/2015 | Kester et al. | |
| 2015/0323449 A1 * | 11/2015 | Jones | G01M 3/38 |
| | | | 356/437 |
| 2015/0336667 A1 * | 11/2015 | Srivastava | G05D 1/1062 |
| | | | 701/2 |
| 2016/0018373 A1 | 1/2016 | Pagé et al. | |
| 2016/0070265 A1 * | 3/2016 | Liu | G05D 1/652 |
| | | | 701/25 |
| 2016/0104250 A1 | 4/2016 | Allen et al. | |
| 2016/0146696 A1 | 5/2016 | Steele et al. | |
| 2016/0161456 A1 | 6/2016 | Risk et al. | |
| 2016/0202225 A1 * | 7/2016 | Feng | G01N 29/022 |
| | | | 422/90 |
| 2016/0214715 A1 * | 7/2016 | Meffert | G01S 17/88 |
| 2016/0307447 A1 | 10/2016 | Johnson et al. | |
| 2016/0357192 A1 | 12/2016 | McGrew et al. | |
| 2017/0003684 A1 | 1/2017 | Knudsen et al. | |
| 2017/0057081 A1 | 3/2017 | Krohne et al. | |
| 2017/0089829 A1 | 3/2017 | Bartholomew et al. | |
| 2017/0093122 A1 | 3/2017 | Bean et al. | |
| 2017/0097274 A1 * | 4/2017 | Thorpe | G01C 15/00 |
| 2017/0115218 A1 | 4/2017 | Huang et al. | |
| 2017/0134497 A1 | 5/2017 | Harter et al. | |
| 2017/0158353 A1 | 6/2017 | Schmick | |
| 2017/0199647 A1 | 7/2017 | Richman et al. | |
| 2017/0206648 A1 | 7/2017 | Marra et al. | |
| 2017/0235018 A1 | 8/2017 | Foster et al. | |
| 2017/0259920 A1 | 9/2017 | Lai et al. | |
| 2017/0307519 A1 | 10/2017 | Black et al. | |
| 2017/0336281 A1 | 11/2017 | Waxman et al. | |
| 2017/0339820 A1 | 11/2017 | Foster et al. | |
| 2018/0023974 A1 | 1/2018 | Otani et al. | |
| 2018/0024091 A1 | 1/2018 | Wang et al. | |
| 2018/0045561 A1 | 2/2018 | Leen et al. | |
| 2018/0045596 A1 | 2/2018 | Prasad et al. | |
| 2018/0050798 A1 | 2/2018 | Kapuria | |
| 2018/0059003 A1 | 3/2018 | Jourdainne et al. | |
| 2018/0067066 A1 | 3/2018 | Giedd et al. | |
| 2018/0109767 A1 | 4/2018 | Li et al. | |

(56) References Cited

U.S. PATENT DOCUMENTS

| | | | |
|---|---|---|---|
| 2018/0122246 A1* | 5/2018 | Clark | G01C 7/04 |
| 2018/0127093 A1 | 5/2018 | Christensen et al. | |
| 2018/0188129 A1* | 7/2018 | Choudhury | G01N 21/85 |
| 2018/0209902 A1* | 7/2018 | Myshak | G01J 3/42 |
| 2018/0259955 A1 | 9/2018 | Noto | |
| 2018/0266241 A1 | 9/2018 | Ferguson et al. | |
| 2018/0266946 A1 | 9/2018 | Kotidis et al. | |
| 2018/0284088 A1 | 10/2018 | Verbeck, IV | |
| 2018/0292374 A1* | 10/2018 | Dittberner | G08G 5/0086 |
| 2018/0321692 A1 | 11/2018 | Castillo-Effen et al. | |
| 2018/0322699 A1 | 11/2018 | Gray et al. | |
| 2019/0011920 A1 | 1/2019 | Heinonen et al. | |
| 2019/0011935 A1 | 1/2019 | Ham et al. | |
| 2019/0025199 A1 | 1/2019 | Koulikov | |
| 2019/0033194 A1 | 1/2019 | DeFreez et al. | |
| 2019/0049364 A1 | 2/2019 | Rubin | |
| 2019/0077506 A1 | 3/2019 | Shaw et al. | |
| 2019/0086202 A1 | 3/2019 | Guan et al. | |
| 2019/0095687 A1 | 3/2019 | Shaw et al. | |
| 2019/0154874 A1 | 5/2019 | Shams et al. | |
| 2019/0178743 A1 | 6/2019 | McNeil | |
| 2019/0195789 A1 | 6/2019 | Pan et al. | |
| 2019/0204189 A1 | 7/2019 | Mohr, Jr. et al. | |
| 2019/0212419 A1 | 7/2019 | Jeong et al. | |
| 2019/0220019 A1 | 7/2019 | Tan et al. | |
| 2019/0228573 A1 | 7/2019 | Sen et al. | |
| 2019/0234868 A1 | 8/2019 | Tanomura et al. | |
| 2019/0331652 A1 | 10/2019 | Ba et al. | |
| 2020/0050189 A1* | 2/2020 | Gu | G08G 5/0069 |
| 2020/0065433 A1 | 2/2020 | Duff et al. | |
| 2020/0109976 A1 | 4/2020 | Ajay et al. | |
| 2020/0135036 A1* | 4/2020 | Campbell | G08G 5/0026 |
| 2020/0182779 A1 | 6/2020 | Kasten et al. | |
| 2020/0249092 A1* | 8/2020 | Podmore | G01M 3/38 |
| 2020/0373172 A1 | 11/2020 | Suzuki | |
| 2020/0400635 A1 | 12/2020 | Potyrailo et al. | |
| 2021/0017926 A1 | 1/2021 | Alkadi et al. | |
| 2021/0037197 A1* | 2/2021 | Kester | H04N 5/33 |
| 2021/0055180 A1* | 2/2021 | Thorpe | G01M 3/04 |
| 2021/0109074 A1 | 4/2021 | Smith et al. | |
| 2021/0140934 A1* | 5/2021 | Smith | G06V 20/17 |
| 2021/0190745 A1* | 6/2021 | Buckingham | G01M 3/16 |
| 2021/0190918 A1 | 6/2021 | Li et al. | |
| 2021/0199565 A1 | 7/2021 | John et al. | |
| 2021/0247369 A1* | 8/2021 | Nottrott | G05D 1/225 |
| 2021/0255158 A1 | 8/2021 | Smith et al. | |
| 2021/0300591 A1 | 9/2021 | Tian | |
| 2021/0321174 A1 | 10/2021 | Sun et al. | |
| 2021/0364427 A1 | 11/2021 | Smith et al. | |
| 2021/0382475 A1 | 12/2021 | Smith et al. | |
| 2022/0082495 A1* | 3/2022 | Kreitinger | G05D 1/695 |
| 2022/0113290 A1 | 4/2022 | Smith et al. | |
| 2022/0170810 A1 | 6/2022 | Miller, II et al. | |
| 2022/0268952 A1 | 8/2022 | Liang et al. | |
| 2022/0341806 A1 | 10/2022 | Miller et al. | |
| 2022/0357231 A1* | 11/2022 | Nahata | G01M 3/22 |
| 2023/0194487 A1 | 6/2023 | Buckingham et al. | |
| 2023/0213413 A1* | 7/2023 | Mohr, Jr. | G01N 33/0073 73/31.01 |
| 2023/0274651 A1* | 8/2023 | McGuire | G08G 5/003 701/3 |
| 2023/0392498 A1* | 12/2023 | Srivastav | E21B 47/00 |

FOREIGN PATENT DOCUMENTS

| | | |
|---|---|---|
| CN | 104458588 A | 3/2015 |
| CN | 205749271 U | 11/2016 |
| CN | 106568516 A | 4/2017 |
| CN | 106769977 A | 5/2017 |
| CN | 107703075 A | 2/2018 |
| CN | 109780452 A | 5/2019 |
| CN | 211508182 U | 9/2020 |
| CN | 112213443 A | 1/2021 |
| DE | 29601472 U1 | 5/1996 |
| DE | 69333010 | 4/2004 |
| DE | 102014013822 A1 | 3/2016 |
| EP | 0450809 A2 | 10/1991 |
| EP | 1371962 B1 | 7/2011 |
| EP | 3339855 A1 | 6/2018 |
| FR | 3047073 A1 | 7/2017 |
| FR | 3047073 B1 | 8/2019 |
| GB | 2538563 A | 11/2016 |
| JP | H08247939 A | 9/1996 |
| JP | 200975823 A | 4/2009 |
| KR | 20170062813 A | 6/2017 |
| KR | 101770254 B1 | 8/2017 |
| TW | 522226 B | 3/2003 |
| WO | 1999054700 A2 | 10/1999 |
| WO | 02066950 A1 | 8/2002 |
| WO | 2008021311 A2 | 2/2008 |
| WO | 2015073687 A1 | 5/2015 |
| WO | 2016045791 A1 | 3/2016 |
| WO | 2016162673 A1 | 10/2016 |
| WO | 2017069979 A1 | 4/2017 |
| WO | 2018121478 A1 | 7/2018 |
| WO | 2018227153 A1 | 12/2018 |
| WO | 2019246280 A1 | 12/2019 |
| WO | 2020007684 A1 | 1/2020 |
| WO | 2020028353 A1 | 2/2020 |
| WO | 2020086499 A1 | 4/2020 |
| WO | 2020206006 A1 | 10/2020 |
| WO | 2020206008 A1 | 10/2020 |
| WO | 2020206020 A1 | 10/2020 |
| WO | 2021055902 A1 | 3/2021 |
| WO | 2021158916 A1 | 8/2021 |
| WO | 2022093864 A1 | 5/2022 |
| WO | 2022211837 A1 | 10/2022 |

OTHER PUBLICATIONS

International Search Report and Written Opinion for PCT/US22/38951, mailed Nov. 28, 2022.

Kelly J F et al. "A capillary absorption spectrometer for stable carbon isotope ratio (C/C) analysis in very small samples", Review of Scientific Instruments, American Institute of Physics, 2 Huntington Quadrangle, Melville, Ny 11747, vol. 83, No. 2, Feb. 1, 2012 (Feb. 1, 2012), pp. 23101-23101, XP012161835, ISSN: 0034-6748, DOI: 10.1063/1.3680593.

Krings et al., Atmos. Meas. Tech., 11, 721-739, Feb. 7, 2018.

International Search Report and Written Opinion for PCT/US23/13893, mailed Jun. 30, 2023.

Lilian Joly, The evolution of AMULSE (Atmospheric Measurements by Ultra-Light Spectrometer) and its interest in atmospheric applications. Results of the Atmospheric Profiles of Greenhouse gasEs (APOGEE) weather balloon release campaign for satellite retrieval validation, p. 1-28, Sep. 25, 2019, Atmospheric Measurement Techniques Discussion (Joly).

International Search Report and Written Opinion for PCT/US2023/023933 mailed Sep. 26, 2023.

Clilverd, Mark A. et al., Energetic particle injection, acceleration, and loss during the geomagnetic disturbances which upset Galaxy 15, Journal of Geophysical Research, vol. 117, A12213, doi: 10.1029/2012JA018175, 2012, pp. 1-16 (Year:2012).

Kem, Christoph et al., Spatial Distribution of Halogen Oxides in the Plume of Mount Pagan Volcano, Mariana Islands, Geophysical Research Letters 10.1029/2018GL079245, Sep. 27, 2018, pp. 9588-9596 (Year:2018).

Liao, J. et al. Observations of Inorganic bromine(HOBr, BrO, and Br2) speciation at Barrow, Alaska in spring 2009, Journal of Geophysical Research, vol. 117, D00R16, doi:10.1029/2011JD016641, 2012, pp. 1-11 (Year:2012).

Liu, Siwen et al., Development of a UAV-Based System to Monitor Air Quality over an Oil Field, Montana Technological University, Montana tech Library Digital Commons @ Montana Tech Graduate Theses & Non-Theses, Fall 2018, pp. 1-85 (Year:2018).

Miyama, Toru et al., Estimating allowable carbon emission for CO2 concentration stabilization using a GCM-based Earth system model, Geophysical Research Letters, vol. 36,L19709, doi:10.1029/2009GL039678, 2009, pg (s) 0094-8276 (Year:2009).

(56) References Cited

OTHER PUBLICATIONS

Oppenheimer Clive et al., Ultraviolet Sensing of Volcanic Sulfur Emissions, Elements (An Internatioknal Magazine of Mineralogy, Geochemistry, and Petrology), Apr. 2010, vol. 6, pp. 87-92 (Year: 2010).
Parazoo, Nicholas C. et al., Interpreting seasonal changes in the carbon balance of southern Amazonia using measurements of XCO2 and chlorophyll fluorescence from Gosat, Geophysical Research Letters, vol. 40.2829-2833, doi: 10.1002/grl.50452, 2013 p. (s0 2829-2833 (Year:2013).
Queiber, Manuel et al., A new frontier in CO2 flux measurements using a highly portable DIAL laser system, Scientific Reports, DOI: 10.1038/srep33834 1, Sep. 22, 2016, pp. 1-13(Year:2016).
Queiber, Manuel et al., Large-area quantification of subaerial CO2 anomalies with portable laser remote sensing and 2d tomography, The Leading Edge Mar. 2018, pp. 306-313 (Year:2018).
"Safesite Multi-Threat Detection System", Jul. 11, 2012 (Jul. 11, 2012), pp. 1-6, XP055245980.
International Search Report and Written Opinion for PCT/US21/56710, mailed Feb. 23, 2022.
U.S. Appl. No. 62/687,147, filed Jun. 19, 2018, Brendan James Smith.
International Search Report and Written Opinion for PCT/US19/38011 mailed Sep. 9, 2019.
International Search Report and Written Opinion for PCT/US19/38015, mailed Oct. 18, 2019.
International Search Report and Written Opinion for PCT/US19/44119, mailed Oct. 17, 2019.
International Search Report and Written Opinion for PCT/US20/26228 mailed Jul. 1, 2020.
International Search Report and Written Opinion for PCT/US20/26232 mailed Jun. 26, 2020.
International Search Report and Written Opinion for PCT/US20/26246 mailed Jun. 29, 2020.
International Search Report and Written Opinion for PCT/US20/51696, mailed Feb. 3, 2021.
International Search Report and Written Opinion for PCT/US2020/044978, mailed Oct. 26, 2020.
International Search Report and Written Opinion for PCT/US2021/016821 mailed Apr. 26, 2021.
International Search Report and Written Opinion for PCT/US2021/024177, mailed Jun. 23, 2021.
International Search Report and Written Opinion for PCT/US2021/056708, mailed Jan. 27, 2022.
International Search Report and Written Opinion for PCT/US21/42061, mailed Nov. 26, 2021.
International Search Report and Written Opinion for PCT/US21/44532, mailed Jan. 11, 2022.
International Search Report and Written Opinion of PCT/US19/57305, mailed Jan. 2, 2020.
International Search Report and Written Opinion of PCT/US20/54117, mailed Dec. 22, 2020.
Joly, "Atmospheric Measurements by Ultra-Light Spectrometer (AMULSE) Dedicated to Vertical Profile In Situ Measurements of Carbon Dioxide (CO2) Under Weather Balloons: Instrumental Development and Field Application," Sensors 2016, 16, 1609.
Khan, "Low Power Greenhouse Gas Sensors for Unmanned Aerial Vehicles", Remote Snse. 2012, 4, 1355-1368.
Villa. "An Overview of Small Unmanned Aerial Vehicles for Air Quality Measurements: Present Applications and Future Prospectives". Sensors. Web . Jul. 12, 2016.
White, "Development of an Unmanned Aerial Vehicle for the Measurement of Turbulence in the Atmospheric Boundary Layer", Atmosphere, v.8, issue 10, 195, pp. 1-25.
Field Trial of Methane Emission Quantification Technologies, Society of Petroleum Engineers, SPE-201537-MS, Allen et al., Oct. 2020.
Uehara, K: "Dependence of harmonic signals 1-15 on sample-gas parameters in wavelength-modulation spectroscopy for precise absorption measurements", Applied Physics B, Springer Berlin Heidelberg, Berlin/Heidelberg, vol. 67, Jan. 2, 1998, pp. 517-523, XP007921671, ISSN:0946-2171, DOI: 10.1007/S003400050537.
Adame J A et al: "Application of cluster analysis to surface ozone, NOand SOdaily patterns in an industrial area in Central-Southern Spain measured with a DOAS system", Science of the Total Environment, Elsevier, Amsterdam, NL, vol. 429, Apr. 11, 2012 (Apr. 11, 2012), pp. 281-291, XP028491183, ISSN: 0048-9697, DOI: 10.1016/J.SCITOTENV.2012.04.032.
Development of a mobile tracer correlation method for assessment of air emissions from landfills and other area sources, Atmospheric Environment 102 (2015) 323-330. T.A. Foster-Wittig et. al. 2015.
Measurements of Methane Emissions from Landfills Using a Time Correlation Tracer Method Based on FTIR Absorption Spectroscopy, Environ. Sci. Technol. 2001, 35, 21-25, B. Galle et. al. 2001.
International Search Report and Written Opinion for PCT/US23/23905 mailed Oct. 5, 2023.
Cabreira et al. "Survey on Coverage Path Planning with Unmanned Aerial Vehicles", published: Drones, published: Jan. 2019, pp. 1-38, year 2019.
Feng, Lingbing, Nowak, Gen, O'Neill, T.J., Welsh, A.H."Cutoff; A spatio-temporal imputation method." Journal of Hydrology 519 (2014) : 3591-3605 (Year:2014).
Coombes et al., "Optimal Polygon Decomposition for UAV Survey Coverage Path Planning in Wind", published: Jul. 2018, publisher: 'Sensors' (Year:2018).
He et al. "Static Targets' Track Path for UAVs Meeting the Revisit Interval Requirement", published :2013, publisher : IEEE (Year:2013).
Tao Lei et al.:"Low-power, open-path mobile sensing platform for high—resolution measurements of greenhouse gases and air pollutants", Applied Physics B, Springer Berlin Heidelberg, Berlin/Heidelberg, vol. 119, No. 1, Mar. 10, 2015 (Mar. 10, 2015), pp. 153-164, XP035445836, ISSN: 0946-2171, DOI:10.1007/S00340-015-6069-1 [retrieved on Mar. 10, 2015].
Tarsitano C G et al: Multilaser Herriott Cell for Planetary Tunable Laser Spectrometers', Applied Optics , Optical Society of America, Washington, DC, US, vol. 46, No. 28, Oct. 1, 2007 (Oct. 1, 2007), pp. 6923-6935, XP001508502, ISSN:0003-6935, DOI: 10.1364/AO.46.006923.

\* cited by examiner

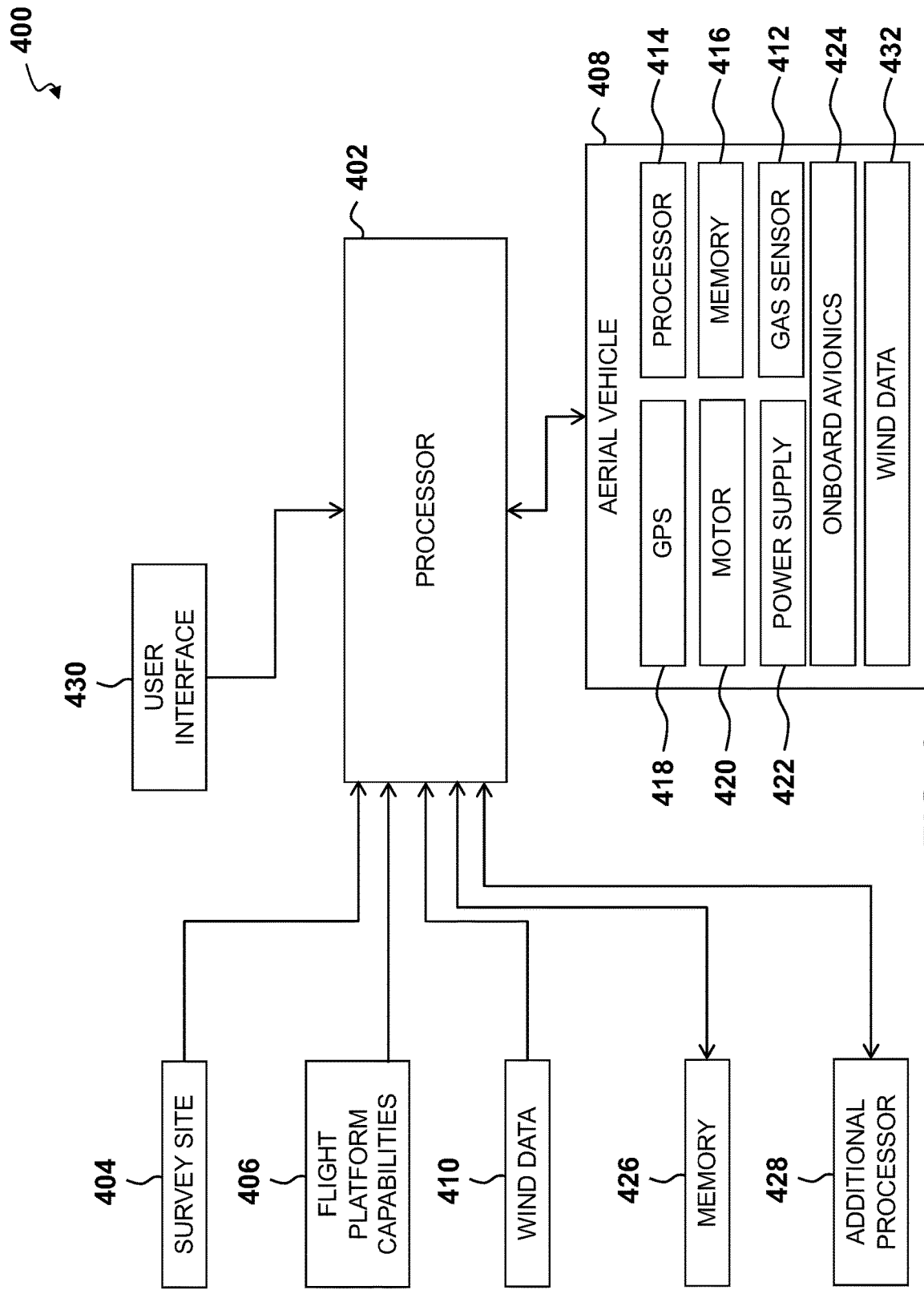

CLOSED SURFACE FLIGHT PATTERN GENERATION FOR UNMANNED AERIAL VEHICLE (UAV) FLUX PLANE ASSESSMENT OF LARGE FACILITIES

CROSS-REFERENCE TO RELATED APPLICATION

This application is a 35 U.S.C. § 371 National Stage Entry of International Application No. PCT/US2020/054117, filed Oct. 2, 2020, which claims the priority benefit of U.S. Provisional Patent Application Ser. No. 62/910,695 filed Oct. 4, 2019, all of which are hereby incorporated herein by reference in their entirety for all purposes.

FIELD OF ENDEAVOR

Embodiments relate generally to gas leak detection, and more particularly to gas leak detection of large facilities.

BACKGROUND

Large facilities may have one or more sources of potential gas leaks. Existing systems and methods for detecting these leaks require large sensors and may be inaccurate due to an inability to capture a complete flux plane of gasses being emitted from these one or more sources of potential gas leaks.

SUMMARY

A system embodiment may include: a processor having addressable memory, where the processor may be configured to: determine one or more flight paths for an aerial vehicle, where the determined flight path creates a continuous surface about one or more potential gas sources of a survey site; receive a trace gas data from one or more trace gas sensors of the aerial vehicle of the continuous surface as the aerial vehicle flies the determined one or more flight paths; and determine based on the received trace gas data whether a gas leak may be present in the received survey site and a rate of the gas leak if present in the survey site.

In additional system embodiments, the continuous surface is a flux plane. In additional system embodiments, the flux plane is a closed flux plane. In additional system embodiments, the continuous surface is formed by any series of turns in the flight path for the aerial vehicle that forms the continuous surface when interpolated.

In additional system embodiments, the processor may be further configured to: receive one or more flight platform capabilities of the aerial vehicle, where the determined flight path may be based on the received one or more flight platform capabilities. In additional system embodiments, the processor may be further configured to: receive a wind data for the survey site, where the determined flight path may be further based on the received wind data. In additional system embodiments, the wind data may include instantaneous wind speed measurements in three dimensions from an anemometer.

In additional system embodiments, the aerial vehicle may be an unmanned aerial vehicle (UAV). In additional system embodiments, the UAV may be configured to fly the determined one or more flight paths autonomously. In additional system embodiments, the UAV may be configured to fly the determined one or more flight paths semi-autonomously.

In additional system embodiments, the continuous surface comprises at least one of: a beehive-shaped continuous surface and a cone-shaped continuous surface. In additional system embodiments, the continuous surface comprises a right angle, an arc, and/or a continuous curve in the flight path for the aerial vehicle. In additional system embodiments, the aerial vehicle flies a determined flight path of the one or more flight path two or more times, and where the received trace gas data may be averaged from each of the two or more flights. In additional system embodiments, the processor may be further configured to, for creating the continuous surface: convert a dataset into an altitude-s space; perform a triangulation on the dataset in the altitude s-space; and apply the performed triangulation on a Cartesian X, Y, Z space of the dataset to produce at least one of: a fully closed surface and a semi-closed surface.

A method embodiment may include: determining, by the processor, one or more flight paths for an aerial vehicle, where the determined flight path creates a continuous surface about one or more potential gas sources of a survey site; receiving, by the processor, a trace gas data from one or more trace gas sensors of the aerial vehicle of the continuous surface as the aerial vehicle flies the determined one or more flight paths; and determining, by the processor, based on the received gas data whether a gas leak may be present in the received survey site and a rate of the gas leak if present in the survey site.

In additional method embodiments, the continuous surface is a flux plane. In additional method embodiments, the flux plane is a closed flux plane. In additional method embodiments, the continuous surface is formed by any series of turns in the flight path for the aerial vehicle that forms the continuous surface when interpolated.

Additional method embodiments may include: receiving, by the processor, one or more flight platform capabilities, where the determined flight path may be based the received one or more flight platform capabilities. Additional method embodiments may include: receiving, by the processor, a wind data for the survey site (210, 404), where the determined flight path may be further based the received one or more flight platform capabilities, and the received wind data.

In additional method embodiments, the aerial vehicle may be an unmanned aerial vehicle (UAV). In additional method embodiments, the UAV may be configured to fly the determined one or more flight paths autonomously. In additional method embodiments, the UAV may be configured to fly the determined one or more flight paths semi-autonomously.

In additional method embodiments, creating the continuous surface further comprises: converting, by the processor, a dataset into an altitude-s space; performing, by the processor, a triangulation on the dataset in the altitude s-space; and applying, by the processor, the performed triangulation on a Cartesian X, Y, Z space of the dataset to produce at least one of: a fully closed surface and a semi-closed surface.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 4 illustrates an example top-level functional block diagram of a flight pattern generation system for creating closed continuous surfaces, according to one embodiment;

DETAILED DESCRIPTION

Figure 1:
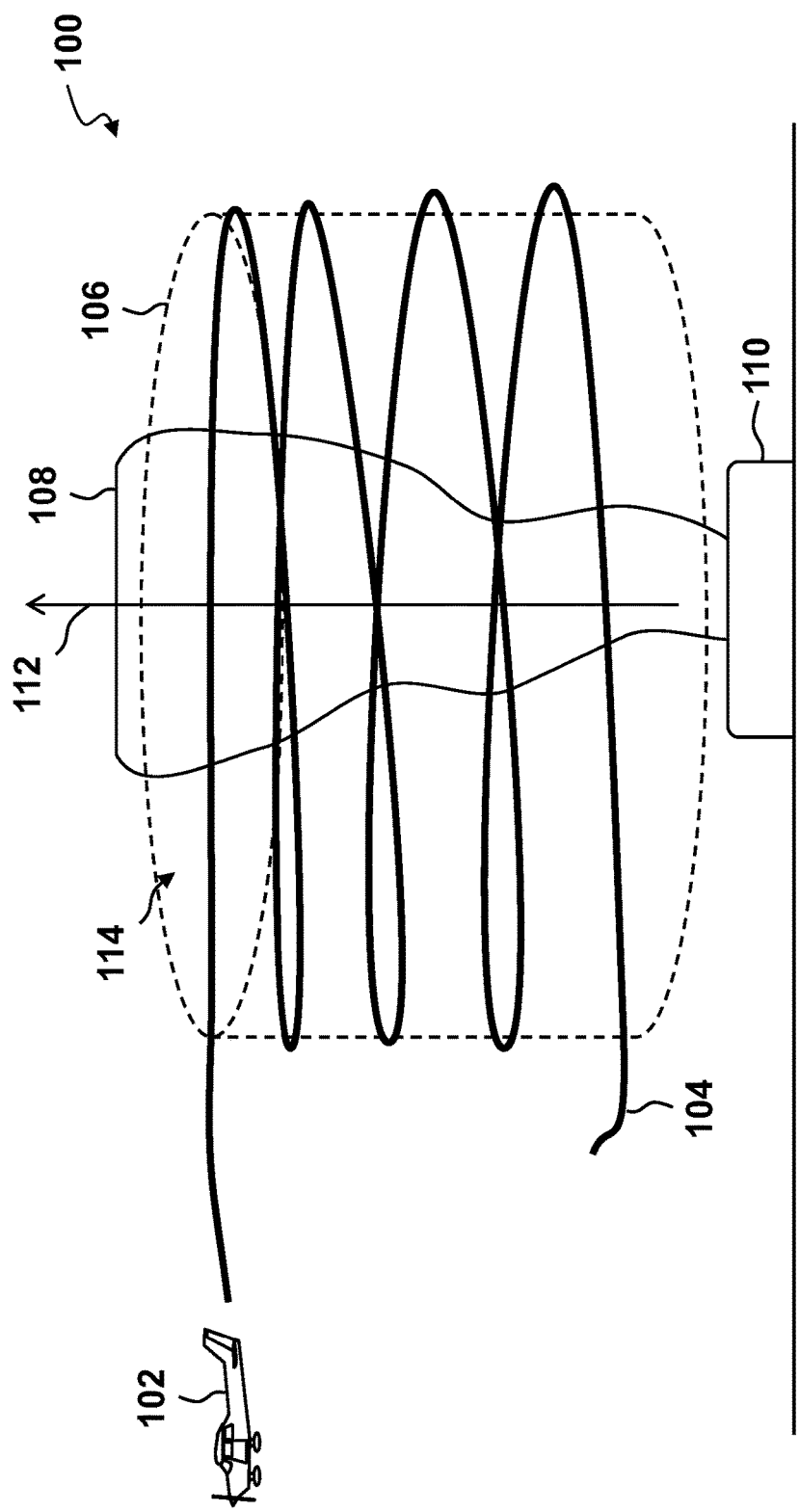
FIG. 1 depicts an aerial vehicle flying a generally cylindrical flight path to survey a continuous surface in cylindrical coordinates and capture a cross-section of a gas from a survey site, according to one embodiment.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The present system allows for the generation of a flight path for an unmanned aerial vehicle (UAV) having one or more gas sensors to fly around a survey site that may contain one or more potential gas sources. The potential gas sources may include a gas pipeline, an oil rig, and the like. The generated flight path for the UAV may form a closed surface around the potential gas source. The generated flight path may allow the UAV to survey a closed continuous surface and capture a cross-section of gas that may be emitted from one or more potential gas sources in a large facility. Embodiments may include a small, highly maneuverable, and/or remotely piloted UAV capable of detecting, localizing, and/ or quantifying gas leaks using novel flight paths.

Trace gas sensors may be used to detect and quantify leaks of toxic gases, e.g., hydrogen disulfide, or environmentally damaging gases, e.g., methane, sulfur dioxide, in a variety of industrial and environmental contexts. Detection and quantification of these leaks are of interest to a variety of industrial operations, such as oil and gas, chemical production, and painting. Detection and quantification of leaks is also of value to environmental regulators for assessing compliance and for mitigating environmental and safety risks.

Industrial sites may be surveyed for toxic gas leaks using a manned flight platform, such as a fixed-wing aircraft or a helicopter. If trace gases are detected near or around a survey site, the leak size, i.e., flow rate, may be estimated by flying a continuous surface that captures a cross-section of the gas. This continuous surface relates the flux of trace gas through a plane with the upstream source, under the assumption that all gas flux originating from the source passes through a plane downstream.

The specific details of a continuous surface flight pattern may be determined by the capabilities of the flight platform, as well as the details of the survey site itself. For example, a survey site with a linear array of potential leak sources, such as a pipeline, may require a different flight pattern than an industrial site that may be essentially an isolated point source. For a linear array, the survey may extend downwind of the site. For a fixed point, or distribution of fixed points, the generated flight pattern may typically be arcs downwind of the fixed point or aggregate of points.

FIG. 1 depicts a system 100 for an aerial vehicle 102 flying a generally cylindrical flight path 104 to survey a continuous surface 106 in cylindrical coordinates and capture a cross-section of a gas 108 from a survey site 110, according to one embodiment. The aerial vehicle 102 may be a fixed-wing flight platform, such as a Cessna aircraft. The aerial vehicle 102 may survey for leaks in the generally cylindrical flight path 104. Laps may be flown around the survey site 110 at different altitudes. The survey site 110 may be a large facility and may include one or more potential gas sources. The generally cylindrical flight path 104 of the aerial vehicle 102 may effectively survey the continuous surface 106 in cylindrical coordinates. The continuous surface 106 is depicted in dashed lines in FIG. 1.

This generally cylindrical flight path 104 may minimize the effect of atmospheric turbulence by effectively drawing a line integral around the survey site 110. Such a flight path 104 may be effective in assuring the detection of a leak and quantifying the source leak rate in some embodiments. However, this flight path 104 is time-consuming and suffers from the inability to assess fluxes in a z-direction 112. The cylindrical flight path 104 fails to measure fluxes flowing out the top 114 of the continuous surface 106. Depending on wind conditions, available time, and the like, the cylindrical flight path 104 may be ineffective in detecting a gas leak for gasses 108 rising up in the z-direction 112 as these gasses 108 may not pass through the cylindrical continuous surface 106. Extending the flight path 104 and cylindrical continuous surface 106 further in the z-direction may capture additional gasses 108 but only at a greatly increased time and energy cost as the aerial vehicle 102 must fly a much further distance.

Figure 2:
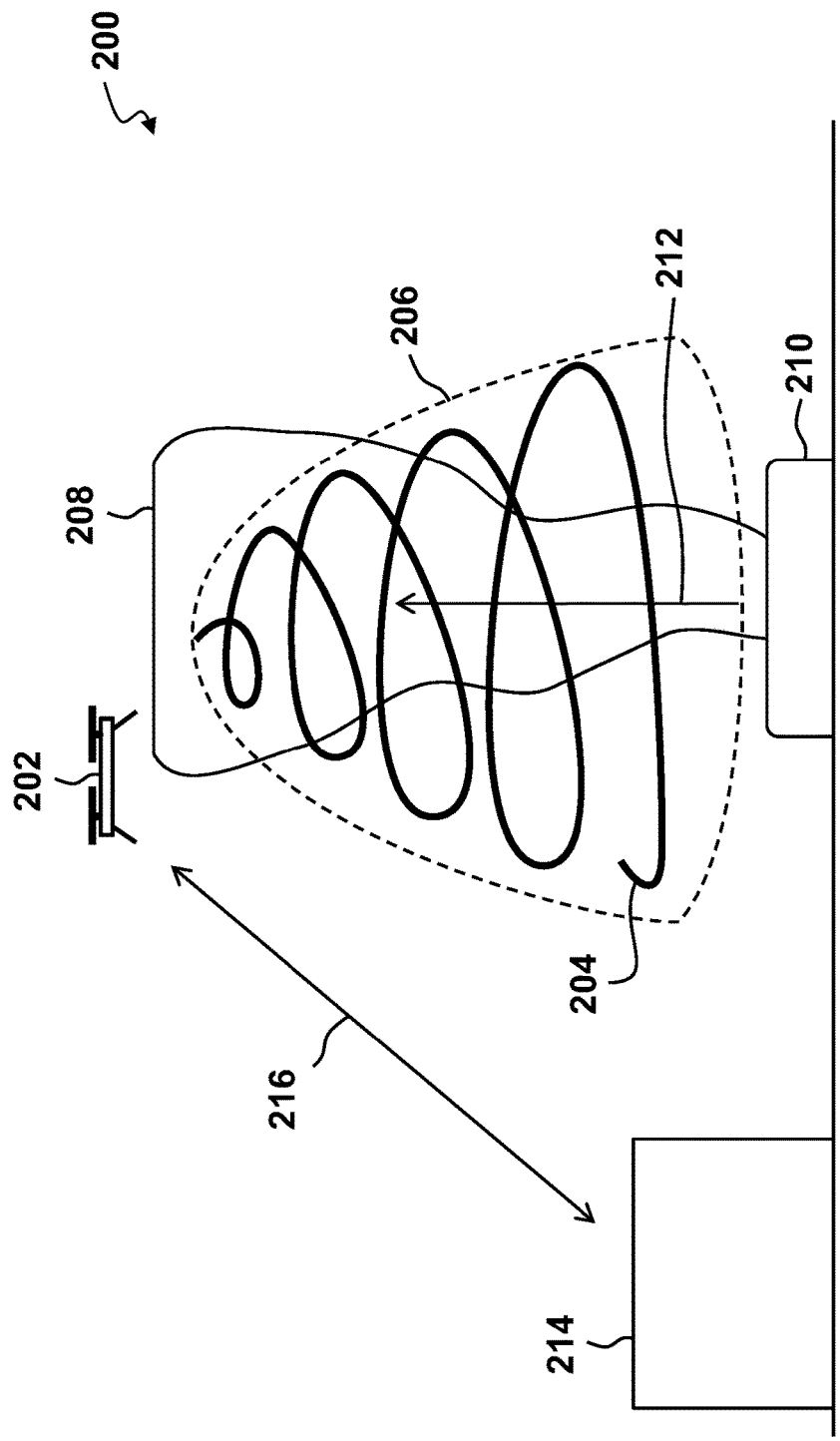
FIG. 2 depicts an unmanned aerial vehicle (UAV) flying a generally beehive-shaped flight path to survey a closed continuous surface and capture a cross-section of a gas from a survey site, according to one embodiment.

FIG. 2 depicts a system 200 for an aerial vehicle such as an unmanned aerial vehicle (UAV) 202 flying a generally beehive-shaped flight path 204 to survey a continuous surface 206 and capture a cross-section of a gas 208 from a survey site 210, according to one embodiment. In some embodiments, the continuous surface 206 may be a flux plane. In other embodiments, the continuous surface 206 may be a closed flux plane. The continuous surface 206 may be formed by any polygon or any series of turns that forms the continuous surface when interpolated. The continuous surface 206 may be formed by a right angle, an arc, and/or a continuous curve in a flight path 204 for the UAV 202. The UAV 202 may be a small, highly maneuverable, and/or remotely piloted airborne platform. The UAV 202 may be used to detect, localize and quantify gas leaks 208 at survey sites 210, such as industrial sites, using novel flight paths 204 that manned aerial platforms, such as shown in FIG. 1, are unable to fly. These manned flight platforms for civilian use may have much lower dynamic performance than unmanned platforms, such as the UAV 202. In some embodiments, the UAV 202 may be a multi-rotor platform, such as a quadcopter, which may not be constrained by a stall speed like fixed-wing platforms, enabling the UAV 202 to stop their motion and incorporate acute angles, obtuse angles, and/or right angles into the flight path.

In some embodiments, the UAV 202 may fly a time- and distance-efficient survey of a gas leak 208 from a survey site 210. The UAV 202 may fly a beehive-shaped flight path 204 around a survey site 210. While the flight path 204 is depicted as forming a generally beehive shape, the flight path 204 may include additional rotations about the survey site 210, variations due to the wind, variations due to survey site conditions, variations due to user settings, variations due to user limitations, and the like. The shape of the flight path 204 may be modified to consider a variety of factors, including possible gas sources, gas plume shapes, and wind velocity. Furthermore, the flight path 204 shape may be generated to account for rules or laws that may require a minimum distance from the source of the leak, such a gas pipeline, offshore oil rig, and the like.

The beehive-shaped flight path 204 may have a smaller radius at higher altitudes, effectively closing off the continuous surface 206, which is depicted in dashed lines. Such a flight path 204 is an improvement upon a cylindrical flight path, such as shown in FIG. 1, in that it both assesses fluxes in the z-direction 212, while also reducing the maximum altitude in the flight path 204, thereby reducing the flight time. The flight path 204 may be completed in a shorter amount of time as compared to a cylindrical flight path. The flight path 204 may be expanded to cover a greater area surrounding the survey site 210 in a shorter or same amount of time as compared to a cylindrical flight path.

A processor 214 may be in communication 216 with the UAV 202. The processor 214 may generate the flight path 204 and communicate 216 the flight path to the UAV 202. The UAV may then fly the flight path 204 and generate gas data, which may be communicated 216 to the processor 214. In some embodiments, the processor 214 may be a ground control station (GCS) used to control the UAV 202. In other embodiments, the processor 214 may be a part of the UAV 202. In some embodiments, the UAV 202 may fly the flight path 204 autonomously or semi-autonomously.

Figure 3B:
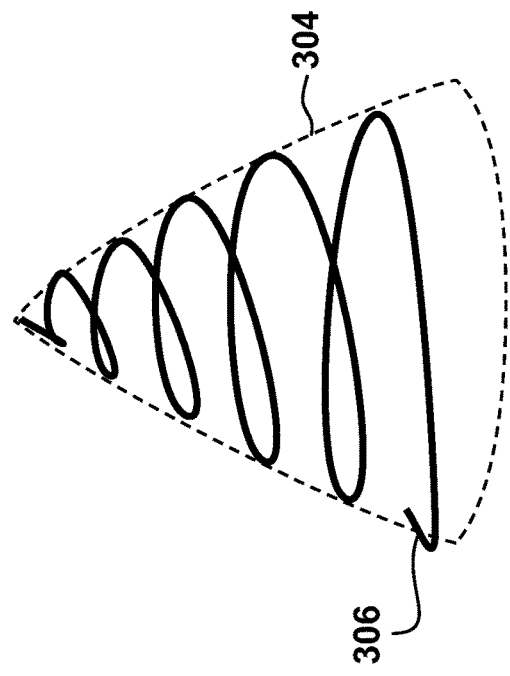
FIGS. 3A-3D depict closed continuous surfaces based on UAV flight paths, according to one embodiment.
Figure 3D:
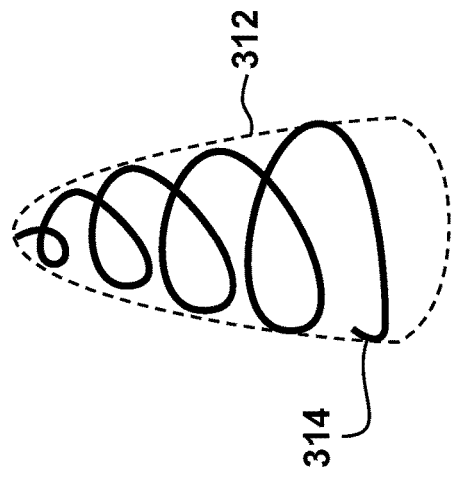
Figure 3A:
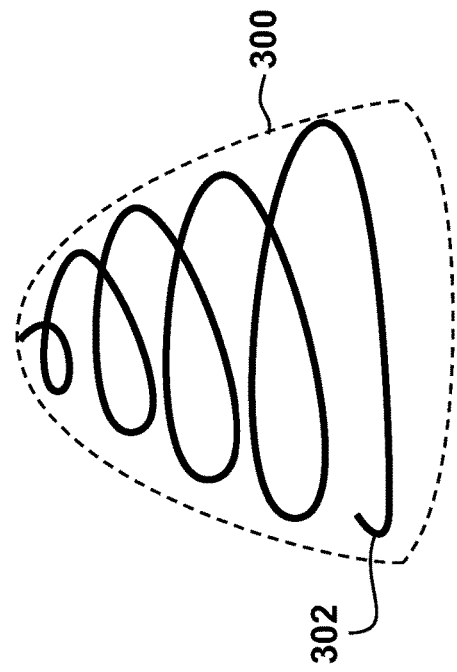
Figure 3C:
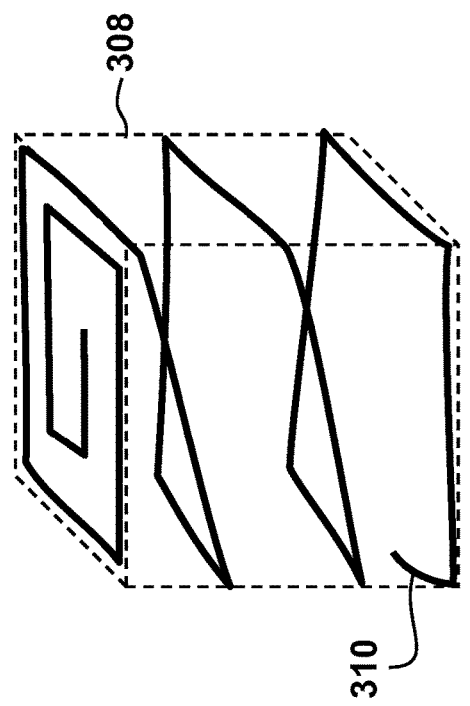

FIGS. 3A-3D depict closed continuous surfaces 300, 304, 308, 312 based on UAV flight paths 302, 306, 310, 314, according to one embodiment. FIG. 3A depicts a beehive-shaped continuous surface 300 created from a first flight path 302. FIG. 3B depicts a cone-shaped continuous surface 304 created from a second flight path 306. FIG. 3C depicts a box-shaped continuous surface 308 created from a third flight path 310. The third flight path 310 may include right angles if the UAV being used is a multi-rotor vehicle, such as a quadcopter. FIG. 3D depicts a cone-shaped continuous surface 312 created from a fourth flight path 314. The shape of a continuous surface created by a flight path from a UAV may be a closed shape that encapsulates the survey site having one or more potential gas leaks.

These closed continuous surfaces may be used to detect the presence of a gas leak and/or the rate of a gas leak. These closed continuous surfaces may be any closed shape and may have variations in the shape due to the wind, survey site conditions, user settings, user limitations, laws and regulations, and the like. In some embodiments, the flight path of the UAV may be a random flight path creating a closed continuous surface rather than a smooth curve, such as shown in FIGS. 3A, 3B, and 3D. In some embodiments, the flight path of the UAV may be flown several times and averaged together to generate a result. For example, a UAV may fly a flight path 2-3 times and the data may be averaged together to generate a more accurate result. In some embodiments, the same flight path may be flown each time. In other embodiments, different flight paths may be flown. For example, a first flight path may be a smooth curve, such as shown in FIG. 3A, 3B, or 3D and a second flight path may be a random pattern. The radius of the closed continuous surface may be a function of the gas sensor sensitivity. A sampling rate for the gas sensor in the UAV flight path may be a compromise between a desired spatial sampling resolution and a minimum detection limit. The planning of the flight path and closed continuous surface may be a desired shape, operational constraints, safety from the customer, optimization of a best scenario for time spent in the plume, and the like.

FIG. 4 illustrates an example top-level functional block diagram of a flight pattern generation system 400 for creating closed continuous surfaces, according to one embodiment. The system 400 may include a processor 402. The processor 402 may receive information on a survey site 404, which may be an area containing one or more potential gas sources. The one or more potential gas sources may be equipment and/or locations more likely to leak toxic gases, such as hydrogen disulfide, or environmentally damaging gases, such as methane and sulfur dioxide. The survey site 404 information may also include user rules, user preferences, rules, and/or laws relating to the survey site 404. For example, local laws may prohibit an aerial vehicle from being within twenty feet of a pipeline and a user preference may be to remain forty feet away from a pipeline in a survey site.

The processor 402 may also receive flight platform capabilities 406 for an aerial vehicle 408. The flight platform capabilities 406 may include battery capacity, payload limits, maximum flight time, operating restrictions, and the like. The flight platform capabilities 406 may also include a maneuverability of the aerial vehicle 408. For example, a quadrotor type aerial vehicle 408 may be able to hover stop, make acute angle turns, make obtuse angle turns, and make right angle turns. A fixed-wing UAV may be limited to a set turn radius and/or minimum flight speed. The aerial vehicle 408 may be an unmanned aerial vehicle (UAV). The UAV may be autonomous and/or semi-autonomous.

The processor 402 may also receive wind data 410. Wind data 410 may include wind speed and/or wind direction for the survey site 404. In some embodiments, wind data 410 may also include predictions as to changes in the wind speed and/or wind direction.

The processor 402 may determine one or more flight paths, such as shown in FIGS. 2-3D, for the aerial vehicle 408 based on the received survey site 404 information, flight platform capabilities 406, and/or wind data 410. The determined one or more flight paths may create a closed continuous surface, such as shown in FIGS. 2-3D, about one or more potential gas sources of the survey site 404.

The aerial vehicle 408 may have at least one trace gas sensor 412 to generate trace gas data based on detected trace gas in the closed continuous surface as the aerial vehicle 408 flies the determined one or more flight paths. The aerial vehicle 408 may have a processor 414 in communication with addressable memory 416, a GPS 418, one or more motors 420, and a power supply 422. The aerial vehicle 408 may receive the flight plan from the processor 402 and communicate gathered gas sensor 412 data to the processor 402. The at least one gas sensor 412 may be configured to detect carbon dioxide. In other embodiments, the at least one trace gas sensor 412 may be configured to detect nitrogen oxide. In other embodiments, the at least one trace gas sensor 412 may be configured to detect sulfur oxide, such as SO, $SO_2$, $SO_3$, $S_7O_2$, $S_6O_2$, $S_2O_2$, and the like.

The GPS 418 may record the location of the aerial vehicle 408 when each gas sensor 412 data is acquired. The GPS 418 may also allow the aerial vehicle 408 to travel the flight path generated by the processor 402. In some embodiments, the location of the aerial vehicle 408 may be determined by an onboard avionics 424. The onboard avionics 424 may include a triangulation system, a beacon, a spatial coordinate system, or the like. The onboard avionics 424 may be used with the GPS 418 in some embodiments. In other embodiments, the aerial vehicle 408 may use only one of the GPS 418 and the onboard avionics 424. The location information from the GPS 418 and/or onboard avionics 424 may be combined with the gas sensor 412 data to determine if gas is present through the closed continuous surface created by the flight plan of the aerial vehicle 408. In some embodiments, wind data 432 may be measured onboard the aerial vehicle 408, such as via a wind sensor mounted to the aerial vehicle 408.

The power supply 422 may be a battery in some embodiments. The power supply 422 may limit the available flight time for the aerial vehicle 408 and so the time- and energy-efficiency flight paths created by the processor 402 allow for the determination as to whether there are any gas leaks through the closed continuous surface. In some embodiments, the processor 402 may be a part of the aerial vehicle 408, a cloud computing device, a ground control station (GCS) used to control the aerial vehicle 408, or the like. In some embodiments, a user interface 430 may in communication with the processor 402. The user interface 430 may be used to select the flight path, make changes to the flight path, receive gas data, or the like. In some embodiments, the user interface 430 may be a part of the processor 402, the additional processor 428, and/or a GCS.

The processor 402 may receive gas data from the one or more trace gas sensors 412 of the aerial vehicle 408. The processor 402 may then determine, based on the received gas data, whether a gas leak is present and/or a rate of the gas leak in the survey site 404. If a gas leak is not detected, no immediate action is needed and further tests may be accomplished in the future to ensure that no gas leaks develop. If a gas leak is detected, then corrective action may be taken to minimize and/or stop the gas leak.

In some embodiments, the processor 402 may be in communication with addressable memory 426. The memory 426 may store the result of whether a gas leak was detected, historical gas data, the flight platform capabilities 406, wind data 814, and/or data from the aerial vehicle 408. In some embodiments, the processor 402 may be in communication with an additional processor 428. The additional processor 428 may be a part of the aerial vehicle 408, a cloud computing device, a GCS used to control the aerial vehicle 408, or the like.

Figure 5:
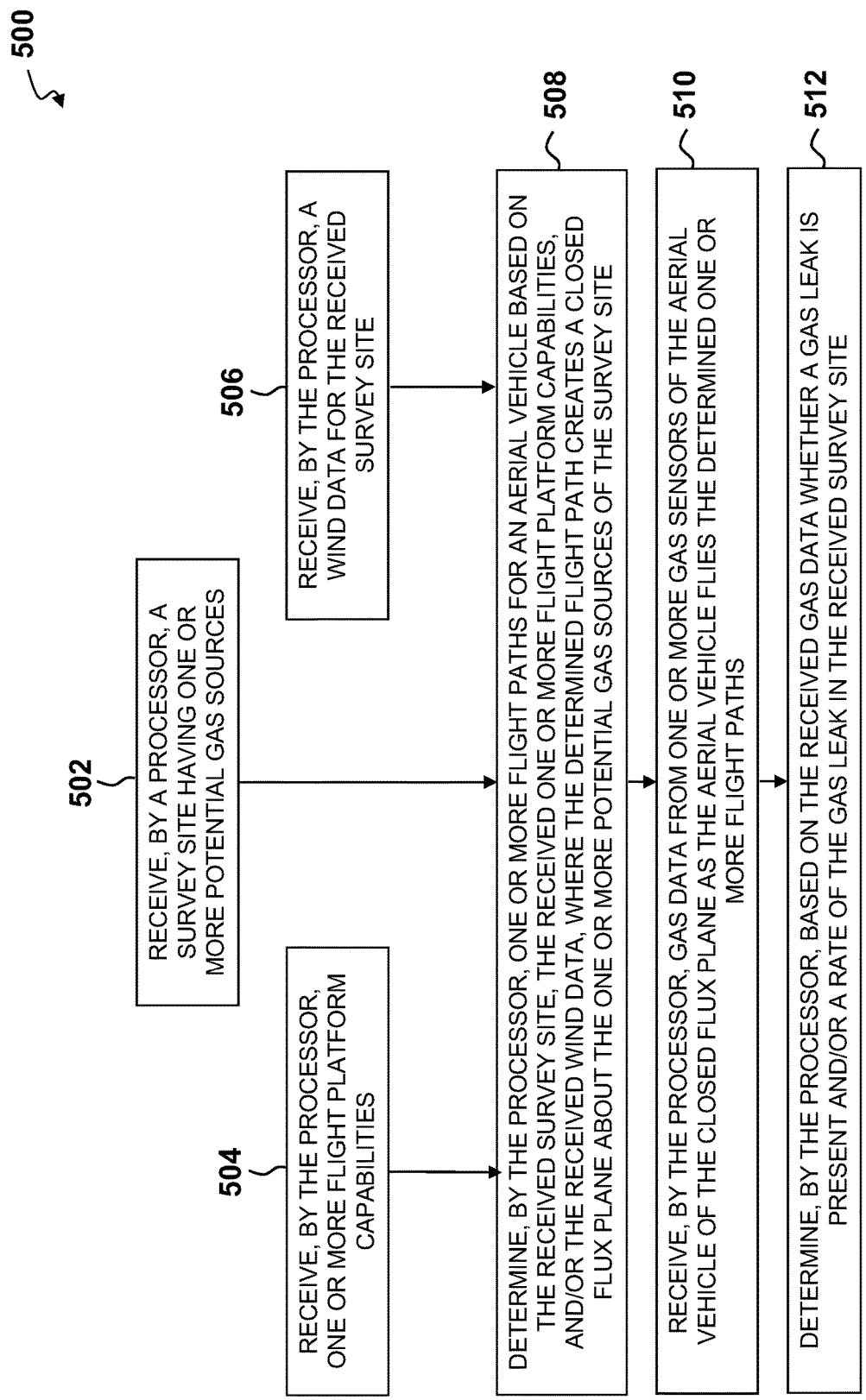
FIG. 5 depicts a high-level flowchart of a method embodiment of generating a flight pattern for creating a closed continuous surface, according to one embodiment.

FIG. 5 depicts a high-level flowchart of a method embodiment 500 of generating a flight pattern for creating a closed continuous surface, according to one embodiment. The method 500 may include receiving, by a processor having addressable memory, a survey site having one or more potential gas sources (step 502). The method 500 may also include receiving, by the processor, one or more flight platform capabilities (step 504). The method 500 may also include receiving, by the processor, a wind data for the received survey site (step 506). The method 500 may then include determining, by the processor, one or more flight paths for an aerial vehicle based on the received survey site, the received one or more flight platform capabilities, and/or the received wind data (step 508). The determined flight path may create a closed continuous surface about the one or more potential gas sources of the survey site. The method 500 may then include receiving, by the processor, gas data from one or more gas sensors of the closed continuous surface as the aerial vehicle flies the determined one or more flight paths (step 510). The method 500 may then include determining, by the processor, based on the received gas data whether a gas leak is present and/or a rate of the gas leak in the received survey site (step 512).

Flying a closed perimeter surface with a UAV may capture all the emissions from a survey site. If a flightpath completely encompasses the survey site, Gauss' Theorem may be applied directly with a processor having addressable memory to calculate the gas leak rate within the flightpath perimeter using the gas concentration measurements detected by the gas sensor at the perimeter. Due to operational constraints, such as access roads, power lines etc. flying a fully closed flightpath may not always possible; therefore, it is preferred to fly the perimeter with a small gap where flying is not possible. This may be referred to as a "semi-Gauss" flight pattern.

Analyzing Gauss and semi-Gauss flight patterns to extract a gas leak rate may require application, with the processor, of computational geometry algorithms. Firstly, a dataset consisting of point measurements made by the UAV in space may be converted into Cartesian coordinates with the processor. The conversion may be done using the Position Easting, Position Northing coordinates from the Extended Kalman Filter (EKF) as the X and Y components, and the Light Detection and Ranging (LiDAR) altitude from a LiDAR range finder for the Z component. Using the EKF outputs for location provides for an accurate alternative measurement of location to GPS.

In order to deduce a source rate of gas emission, the individual flux values may have to be integrated over the whole dataset of spatial coordinates. Once the dataset has been converted into Cartesian space, the processor may triangulate the point measurements, thereby providing a continuous surface to determine the surface integral on (dS), where S is the surface:

$$\iiint_V (\nabla \cdot F) dV = \oiint_S (F \cdot n) dS$$

Figure 6:
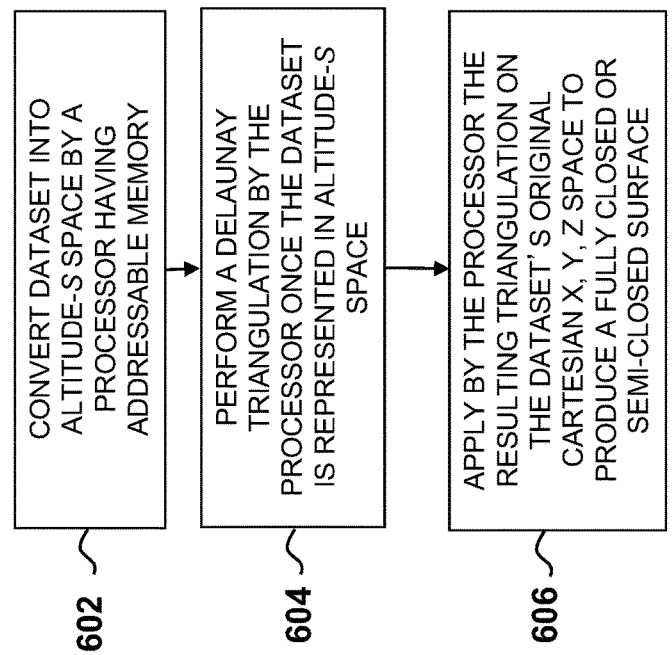
FIG. 6 depicts a high-level flowchart of a method embodiment of generating a continuous surface, according to one embodiment.

FIG. 6 depicts a high-level flowchart of a method embodiment 600 of generating a continuous surface, according to one embodiment. Generally speaking, Delaunay Triangulation methods create a two-dimensional triangulation, or surface, from a two-dimensional dataset; however, said methods are not able to create a two-dimensional surface from a three-dimensional dataset. Therefore, before applying a Delaunay Triangulation algorithm, the dataset must first be represented in two-dimensional space. For Gauss and semi-Gauss flightpaths, the dataset can be converted into altitude-s space by a processor having addressable memory, where altitude is the same dimension as in the three-dimensional dataset, and s is a new dimension measuring distance along the pass made by the UAV (step 602). For example, in a Gauss flightpath, the value of s monotonically increases along the pass, until the UAV reaches a determined point and then the value of s starts again from zero. With regards to a semi-Gauss flightpath, the value of s monotonically increases until the UAV reaches whatever obstacle the UAV must avoid, and then the UAV preforms a U-turn and backtracks along the same path (at a different altitude) while the value of s decreases. Both methods, including the identification of crossing a home point and detection of U-turn points are automatically processed by a processor having addressable memory.

Once the dataset is represented in altitude-s space, a Delaunay Triangulation may be performed by the processor (step 604). The resulting triangulation may then be applied by the processor on the dataset's original Cartesian X, Y, Z space to produce a fully closed or semi-closed surface (step 606), with all the original scalar values (e.g. gas concentrations) intact.

Figure 7:
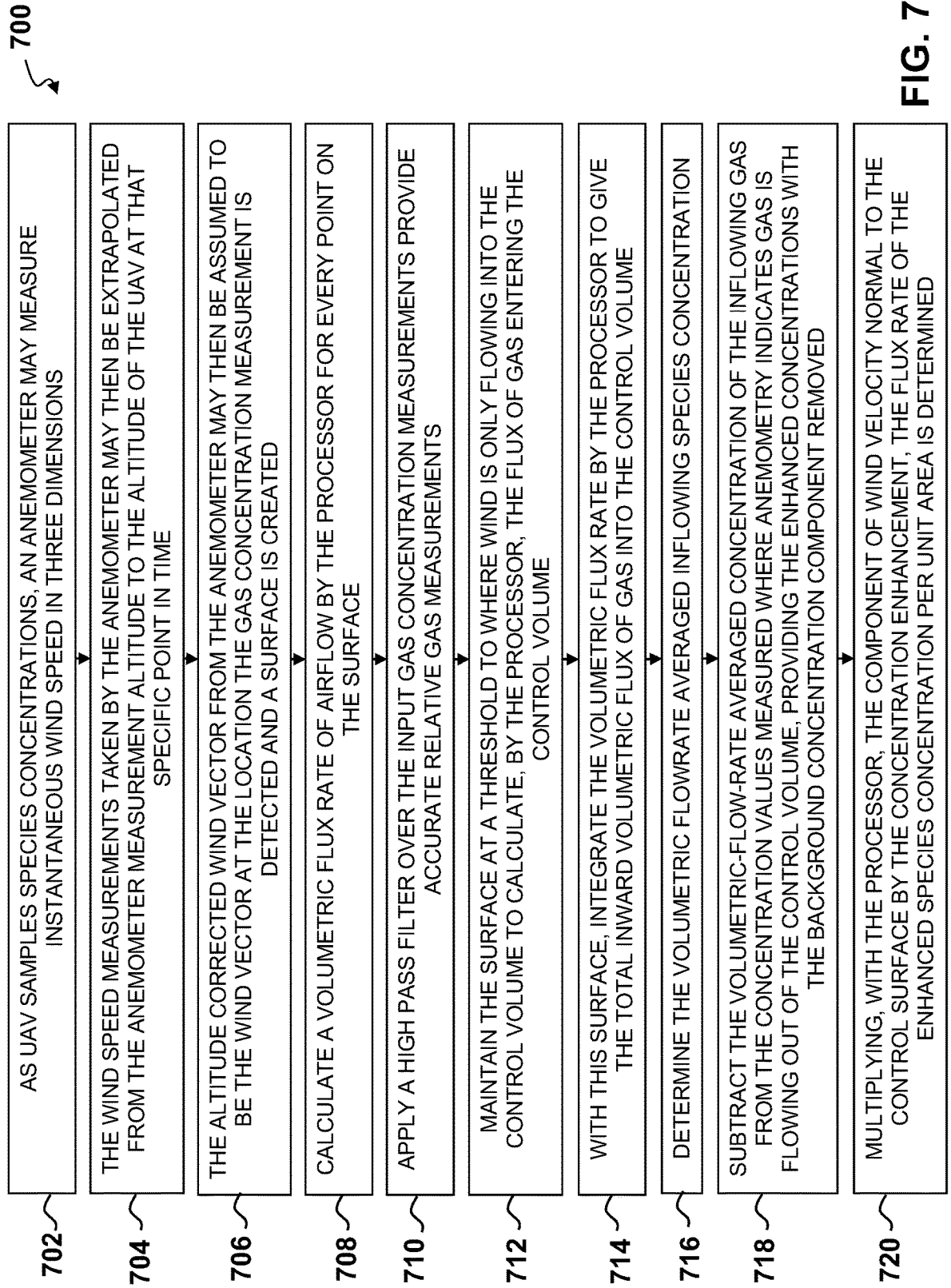
FIG. 7 depicts a high-level flowchart of a method embodiment of determining a volumetric flowrate of inflowing gas species concentration, according to one embodiment.

FIG. 7 depicts a high-level flowchart of a method embodiment 700 of determining a volumetric flowrate of inflowing gas species concentration, according to one embodiment. In addition to the measurements made using an IR sensor mounted to an airframe of the UAV, an anemometer may be set up on-site at a suitable location to detect unaffected wind measurements. As the UAV is sampling species concentrations, the anemometer may measure instantaneous wind speed in three dimensions (step 702). These measurements may be recorded at synchronized times as the species concentrations are made. An appropriate aerodynamic surface roughness length may be selected to represent the local ground conditions surrounding the measurement survey site. The wind speed measurements taken by the anemometer may then be extrapolated from the anemometer measurement altitude to the altitude of the UAV at that specific point in time (step 704). This may be done by a processor having addressable memory using a log-law boundary condition model for flows near rough boundaries. In one embodiment, the wind direction remains uncorrected, and only the magnitude of the wind speed is scaled using the log-law. The altitude corrected wind vector from the anemometer may then be assumed to be the wind vector at the location the gas concentration measurement is detected and a surface is created (step 706). In moderate wind speed conditions, the stability of the atmospheric boundary layer increases, resulting in less wind variance, therefore giving better correlation between the anemometer measurement and the wind at the sensor.

With the surface now created, a surface normal unit vector may be calculated by the processor at each point in the dataset; the dot product of the surface normal vector and the wind vector may then be calculated by the processor. A volumetric flux rate of airflow may then by calculated by the processor for every point on the surface (step 708). The volumetric flux rate of airflow represents how many cubic meters of air is entering or leaving the control volume per square meter (dS).

In one embodiment, a high pass filter may be applied over the input gas concentration measurements provide accurate relative gas measurements (step 710). The filter removes any low frequency sensor drift, while still resolving all details from emissions. The time constant chosen for the filter may be based on analysis of the sensor stability.

In one embodiment, multiplying the above wind flux values from step 708 by the volume fraction of gas (m³ $CH_4$ or $CO_2$/m³ air) with the processor provides the volumetric flux rate of gas at each point (m³ gas/s/m² area).

Because the control surface does not completely encompass the control volume, and the measurements were not taken concurrently, the standard incompressible equation of continuity may not hold true.

$$\nabla \cdot u \neq 0$$

Therefore, the net flux may not simply be calculated by integrating the point gas flux measurements across the entire surface; rather, to calculate the flux of gas entering the control volume, the surface may be kept at a threshold to where wind is only flowing into the control volume (step 712). With this surface, the volumetric flux rate of gas can be integrated by the processor to give the total inward volumetric flux of gas into the control volume (m³ species/s) (step 714).

$$\text{volumetric flowrate averaging} = \frac{\int_A \frac{dc}{\partial A} dA}{\int_A \frac{du}{\partial A} dA}$$

Once the species flux rate has been established, a total air volumetric rate may be determined by the processor as well by integrating the wind velocity normal component to give a total air volumetric flux rate. By dividing the species volumetric flux rate by the air volumetric flux rate, the volumetric flowrate averaged inflowing species concentration may be determined by the processor (step 716).

Although a similar solution could be obtained by simply averaging all the values of volumetric flux rate of gas at each point, the triangulation of the real-world dataset yields varied triangles, and this difference in size should be considered when calculating the average incoming volumetric gas flux rate. This process to get the total background concentration value is "volumetric flow averaging" and is necessary for calculating convective quantities such as species concentrations. In this case, the integral operator is not commutative because the wind values vary on the surface, and therefore the two integrals must be performed separately, and their results divided together.

The volumetric-flow-rate averaged concentration of the inflowing gas may then be subtracted from the concentration values measured where anemometry indicates gas is flowing out of the control volume, providing the enhanced concentrations with the background concentration component removed (step 718).

With the enhanced concentration values, the final net flux rate can be calculated by the processor. Multiplying, with the processor, the component of wind velocity normal to the control surface by the concentration enhancement, the flux rate of the enhanced species concentration per unit area is determined (m³species/m²/second) (step 720).

This approach has the benefit that it satisfies the fundamental fluid dynamics equation for flow of a species through a control volume. Continuity of the species is used to ensure that all of the concentration upstream is subtracted from the concentration downstream, even if the oncoming flow has not got a uniform concentration of gas. Because the control volume is still open at the top, and the discrete sampling process means that there are gaps in the control surface, absolute integrals of continuity of mass and continuity of species cannot be simply applied. In addition, sampling all the points non-simultaneously, and in transient wind conditions, means that flux through any point in the control surface is constantly changing.

Despite fully considering the background concentration into calculations, there is still a significant degree of error incurred from wind speed measurement. In one embodiment, the disclosed process may utilize a ground weather station that is set up on-site in a location with the least amount of interference from other obstacles as possible.

Even in the optimal location, the anemometer is not co-located with the UAV at any time, and so the reading at the anemometer will be different from the actual wind-speed at the UAV. This effect is particularly strong during light wind conditions, as a small change in the wind speed can incur a large change in the concentration values measured. In light wind conditions, the atmospheric boundary layer is also more unstable, resulting in more diffusion of the species plume, and therefore lower concentration values than with a more consistent wind.

Figure 8:
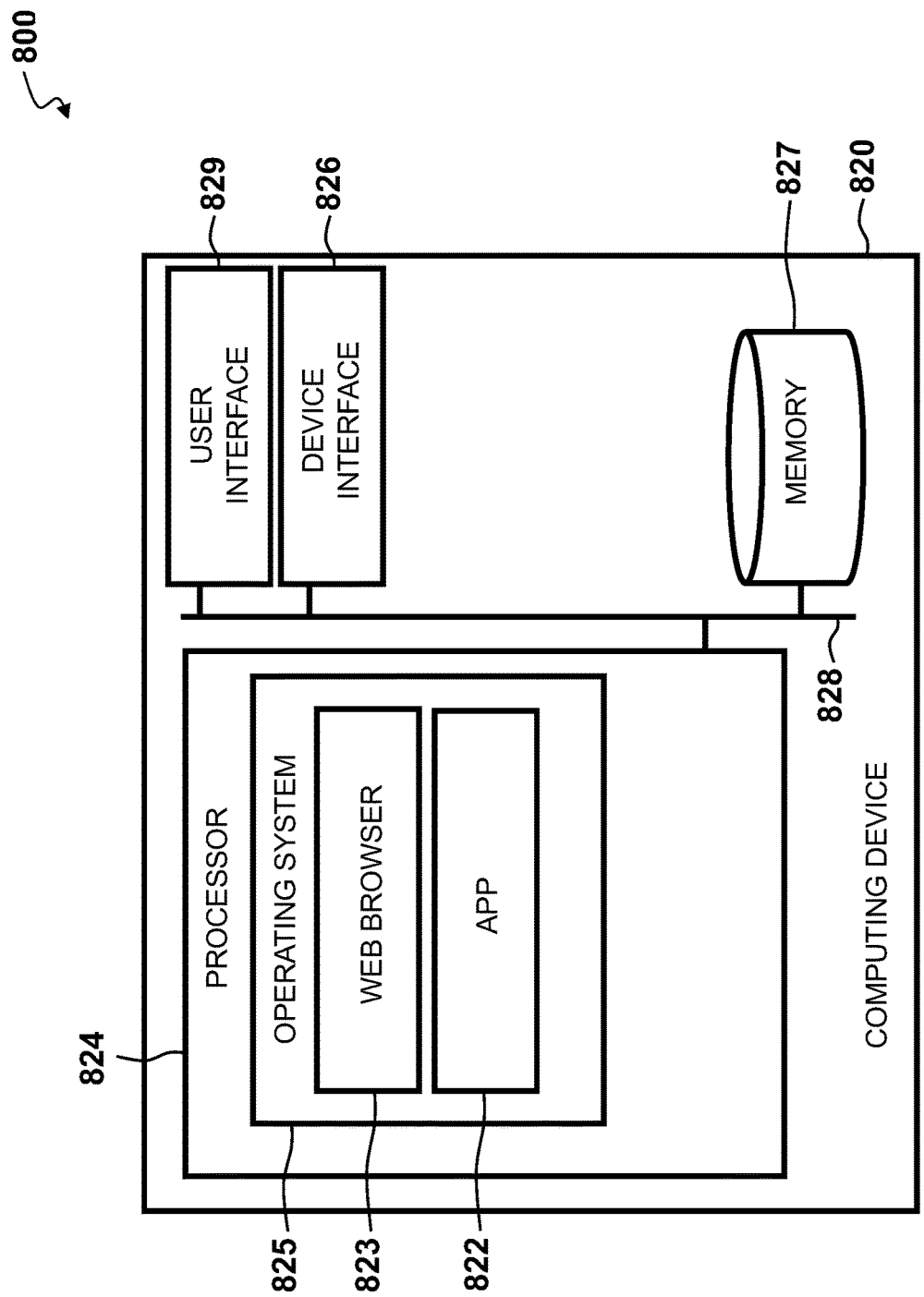
FIG. 8 illustrates an example top-level functional block diagram of a computing device embodiment.
Figure 9:
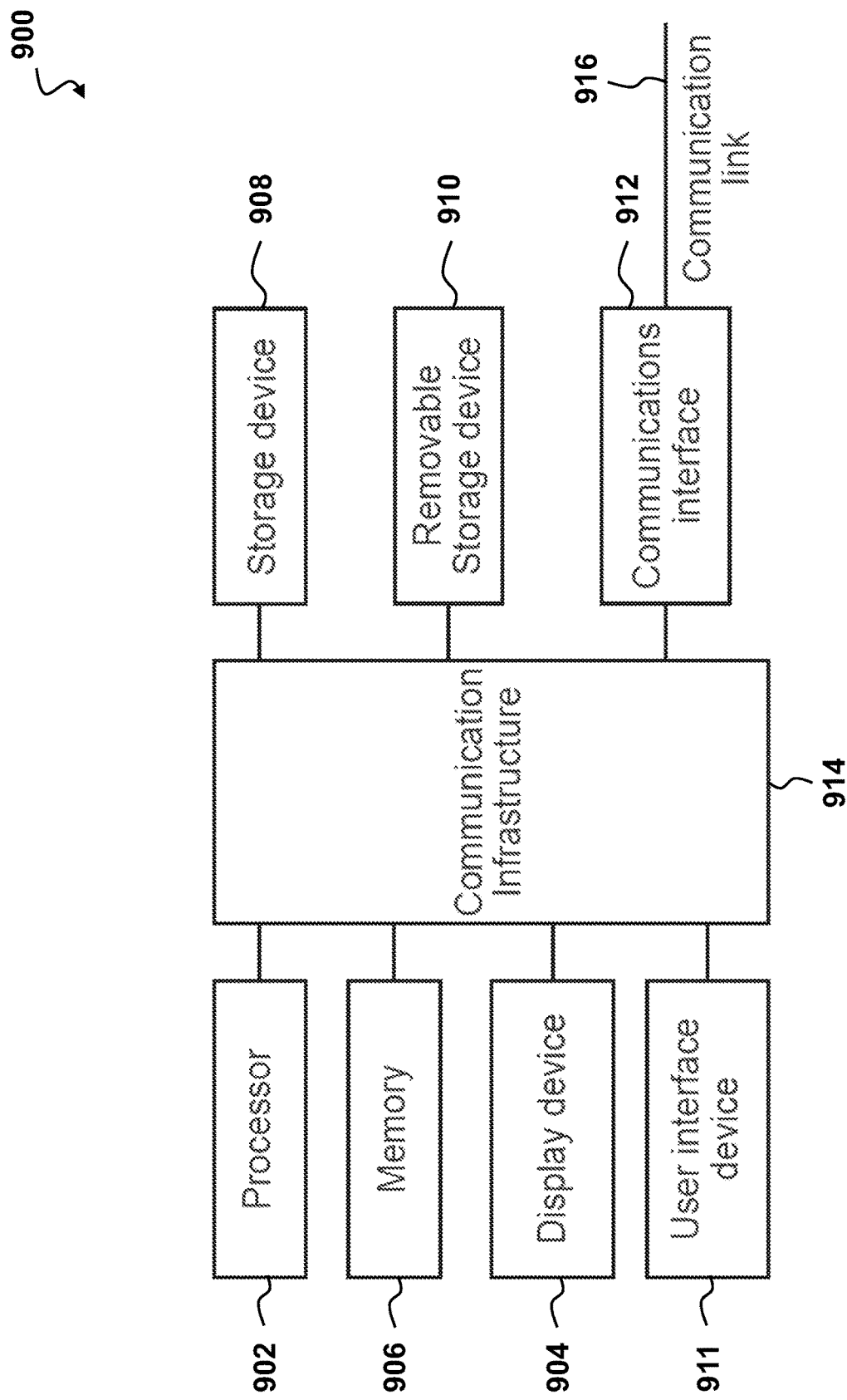
FIG. 9 shows a high-level block diagram and process of a computing system for implementing an embodiment of the system and process.
Figure 10:
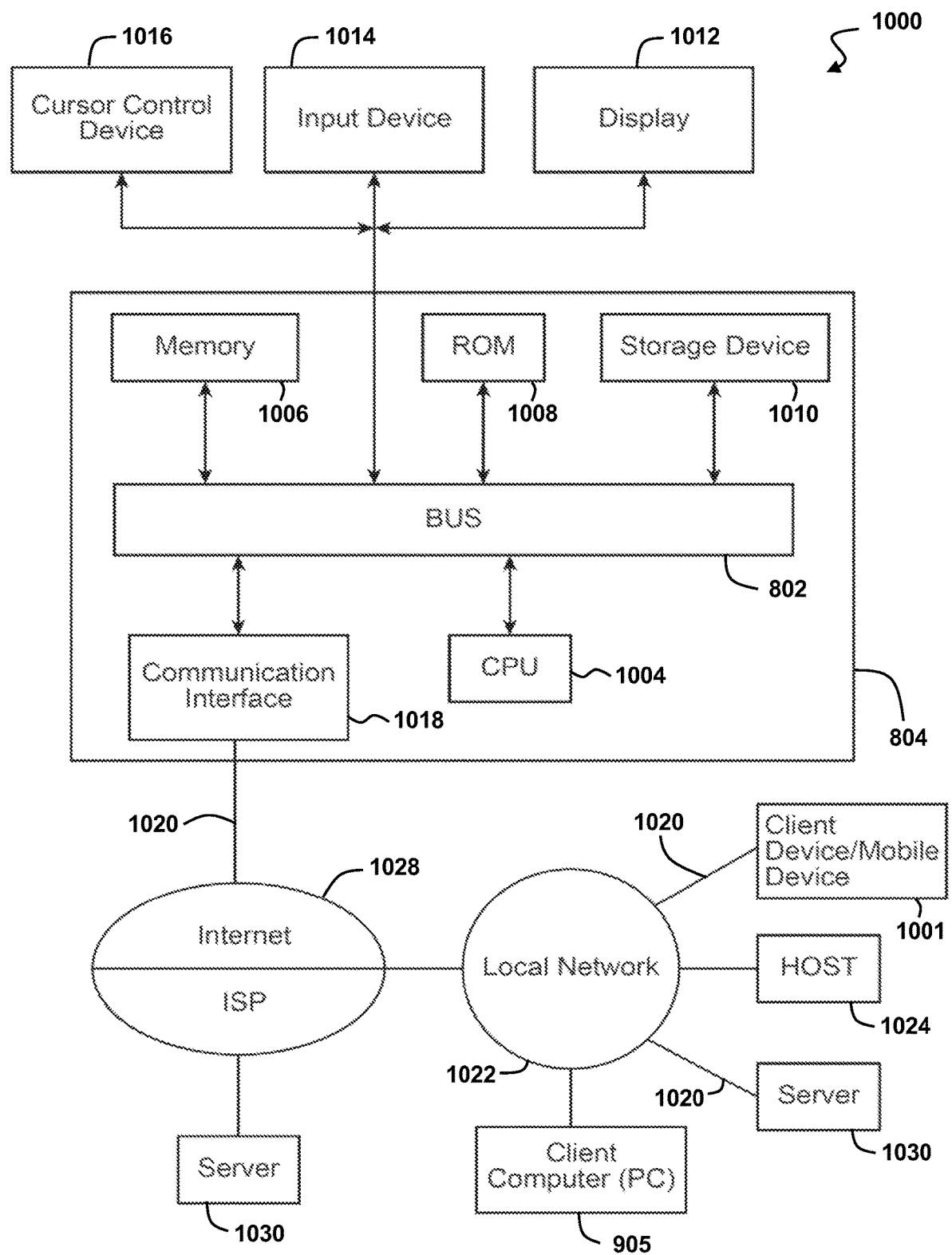
FIG. 10 shows a block diagram and process of an exemplary system in which an embodiment may be implemented.

FIG. 8 illustrates an example of a top-level functional block diagram of a computing device embodiment 800. The example operating environment is shown as a computing device 820 comprising a processor 824, such as a central processing unit (CPU), addressable memory 827, an external device interface 826, e.g., an optional universal serial bus port and related processing, and/or an Ethernet port and related processing, and an optional user interface 829, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 828. In some embodiments, via an operating system 825 such as one supporting a web browser 823 and applications 822, the processor 824 may be configured to execute steps of a process establishing a communication channel and processing according to the embodiments described above.

System embodiments include computing devices such as a server computing device, a buyer computing device, and a seller computing device, each comprising a processor and addressable memory and in electronic communication with each other. The embodiments provide a server computing device that may be configured to: register one or more buyer computing devices and associate each buyer computing device with a buyer profile; register one or more seller computing devices and associate each seller computing device with a seller profile; determine search results of one or more registered buyer computing devices matching one or more buyer criteria via a seller search component. The service computing device may then transmit a message from the registered seller computing device to a registered buyer computing device from the determined search results and provide access to the registered buyer computing device of a property from the one or more properties of the registered seller via a remote access component based on the transmitted message and the associated buyer computing device; and track movement of the registered buyer computing device in the accessed property via a viewer tracking component. Accordingly, the system may facilitate the tracking of buyers by the system and sellers once they are on the property and aid in the seller's search for finding buyers for their property. The figures described below provide more details about the implementation of the devices and how they may interact with each other using the disclosed technology.

FIG. 9 is a high-level block diagram 900 showing a computing system comprising a computer system useful for implementing an embodiment of the system and process, disclosed herein. Embodiments of the system may be implemented in different computing environments. The computer system includes one or more processors 902, and can further include an electronic display device 904 (e.g., for displaying graphics, text, and other data), a main memory 906 (e.g., random access memory (RAM)), storage device 908, a removable storage device 910 (e.g., removable storage drive, a removable memory module, a magnetic tape drive, an optical disk drive, a computer readable medium having stored therein computer software and/or data), user interface device 911 (e.g., keyboard, touch screen, keypad, pointing device), and a communication interface 912 (e.g., modem, a network interface (such as an Ethernet card), a communications port, or a PCMCIA slot and card). The communication interface 912 allows software and data to be transferred between the computer system and external devices. The system further includes a communications infrastructure 914 (e.g., a communications bus, cross-over bar, or network) to which the aforementioned devices/modules are connected as shown.

Information transferred via communications interface 914 may be in the form of signals such as electronic, electromagnetic, optical, or other signals capable of being received by communications interface 914, via a communication link 916 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 912. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

FIG. 10 shows a block diagram of an example system 1000 in which an embodiment may be implemented. The system 1000 includes one or more client devices 1001 such as consumer electronics devices, connected to one or more server computing systems 1030. A server 1030 includes a bus 1002 or other communication mechanism for communicating information, and a processor (CPU) 1004 coupled with the bus 1002 for processing information. The server 1030 also includes a main memory 1006, such as a random access memory (RAM) or other dynamic storage device, coupled to the bus 1002 for storing information and instructions to be executed by the processor 1004. The main memory 1006 also may be used for storing temporary variables or other intermediate information during execution or instructions to be executed by the processor 1004. The server computer system 1030 further includes a read only memory (ROM) 1008 or other static storage device coupled to the bus 1002 for storing static information and instructions for the processor 1004. A storage device 1010, such as a magnetic disk or optical disk, is provided and coupled to the bus 1002 for storing information and instructions. The bus 1002 may contain, for example, thirty-two address lines for addressing video memory or main memory 1006. The bus 1002 can also include, for example, a 32-bit data bus for transferring data between and among the components, such as the CPU 1004, the main memory 1006, video memory and the storage 1010. Alternatively, multiplex data/address lines may be used instead of separate data and address lines.

The server 1030 may be coupled via the bus 1002 to a display 1012 for displaying information to a computer user. An input device 1014, including alphanumeric and other keys, is coupled to the bus 1002 for communicating information and command selections to the processor 1004. Another type or user input device comprises cursor control 1016, such as a mouse, a trackball, or cursor direction keys for communicating direction information and command selections to the processor 1004 and for controlling cursor movement on the display 1012.

According to one embodiment, the functions are performed by the processor 1004 executing one or more sequences of one or more instructions contained in the main memory 1006. Such instructions may be read into the main memory 1006 from another computer-readable medium, such as the storage device 1010. Execution of the sequences of instructions contained in the main memory 1006 causes the processor 1004 to perform the process steps described herein. One or more processors in a multi-processing arrangement may also be employed to execute the sequences of instructions contained in the main memory 1006. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1004 for execution. Such a medium may take many forms, including but not limited to, non-volatile media, volatile media, and transmission media. Non-volatile media includes, for example, optical or magnetic disks, such as the storage device 1010. Volatile media includes dynamic memory, such as the main memory 1006. Transmission media includes coaxial cables, copper wire and fiber optics, including the wires that comprise the bus 1002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1004 for execution. For example, the instructions may initially be carried on a magnetic disk of a remote computer. The remote computer can load the instructions into its dynamic memory and send the instructions over a telephone line using a modem. A modem local to the server 1030 can receive the data on the telephone line and use an infrared transmitter to convert the data to an infrared signal. An infrared detector coupled to the bus 1002 can receive the data carried in the infrared signal and place the data on the bus 1002. The bus 1002 carries the data to the main memory 1006, from which the processor 1004 retrieves and executes the instructions. The instructions received from the main memory 1006 may optionally be stored on the storage device 1010 either before or after execution by the processor 1004.

The server 1030 also includes a communication interface 1018 coupled to the bus 1002. The communication interface 1018 provides a two-way data communication coupling to a network link 1020 that is connected to the world wide packet data communication network now commonly referred to as the Internet 1028. The Internet 1028 uses electrical, electromagnetic or optical signals that carry digital data streams. The signals through the various networks and the signals on the network link 1020 and through the communication interface 1018, which carry the digital data to and from the server 1030, are exemplary forms or carrier waves transporting the information.

In another embodiment of the server 1030, interface 1018 is connected to a network 1022 via a communication link 1020. For example, the communication interface 1018 may be an integrated services digital network (ISDN) card or a modem to provide a data communication connection to a corresponding type of telephone line, which can comprise part of the network link 1020. As another example, the communication interface 1018 may be a local area network (LAN) card to provide a data communication connection to a compatible LAN. Wireless links may also be implemented. In any such implementation, the communication interface 1018 sends and receives electrical electromagnetic or optical signals that carry digital data streams representing various types of information.

The network link 1020 typically provides data communication through one or more networks to other data devices. For example, the network link 1020 may provide a connection through the local network 1022 to a host computer 1024 or to data equipment operated by an Internet Service Provider (ISP). The ISP in turn provides data communication services through the Internet 1028. The local network 1022 and the Internet 1028 both use electrical, electromagnetic or optical signals that carry digital data streams. The signals through the various networks and the signals on the network link 1020 and through the communication interface 1018, which carry the digital data to and from the server 1030, are exemplary forms or carrier waves transporting the information.

The server 1030 can send/receive messages and data, including e-mail, program code, through the network, the network link 1020 and the communication interface 1018. Further, the communication interface 1018 can comprise a USB/Tuner and the network link 1020 may be an antenna or cable for connecting the server 1030 to a cable provider, satellite provider or other terrestrial transmission system for receiving messages, data and program code from another source.

The example versions of the embodiments described herein may be implemented as logical operations in a distributed processing system such as the system 1000 including the servers 1030. The logical operations of the embodiments may be implemented as a sequence of steps executing in the server 1030, and as interconnected machine modules within the system 1000. The implementation is a matter of choice and can depend on performance of the system 1000 implementing the embodiments. As such, the logical operations constituting said example versions of the embodiments are referred to for e.g., as operations, steps or modules.

Similar to a server 1030 described above, a client device 1001 can include a processor, memory, storage device, display, input device and communication interface (e.g., e-mail interface) for connecting the client device to the Internet 1028, the ISP, or LAN 1022, for communication with the servers 1030.

The system 1000 can further include computers (e.g., personal computers, computing nodes) 1005 operating in the same manner as client devices 1001, where a user can utilize one or more computers 1005 to manage data in the server 1030.

Figure 11:
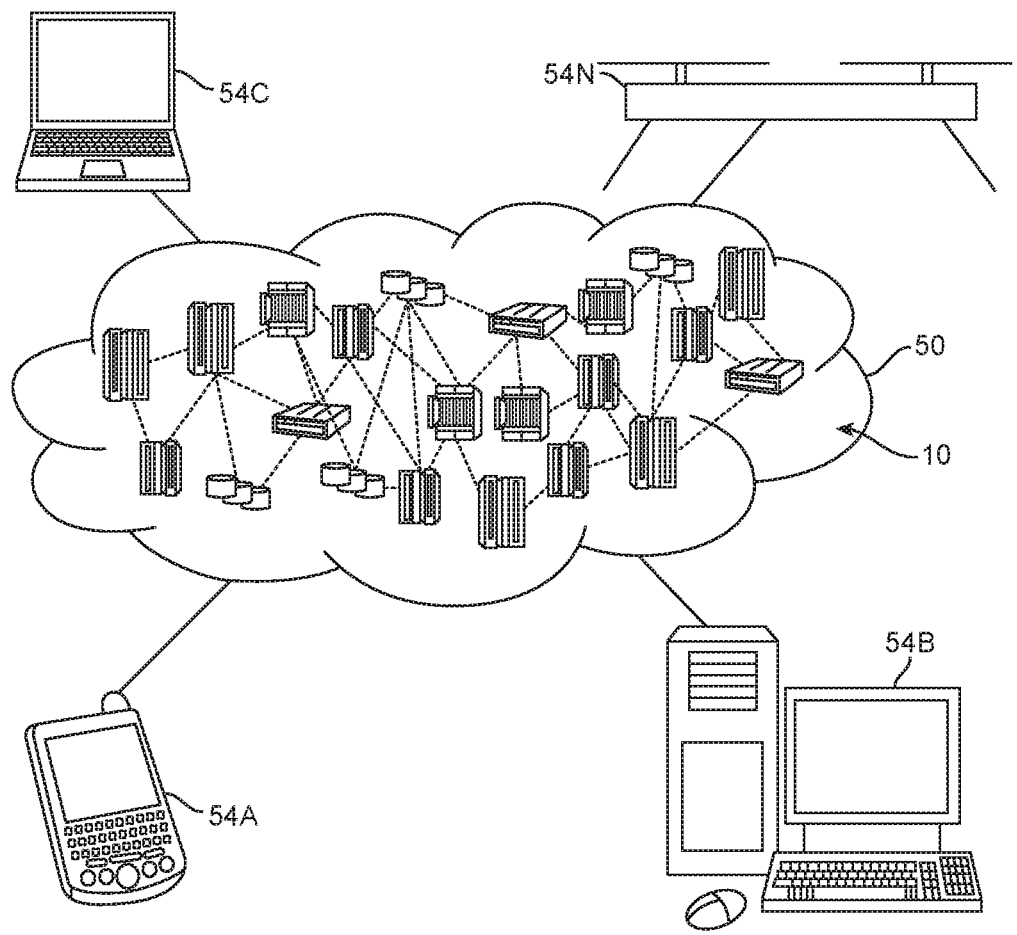
FIG. 11 depicts a cloud computing environment for implementing an embodiment of the system and process disclosed herein.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or unmanned aerial vehicle (UAV) 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
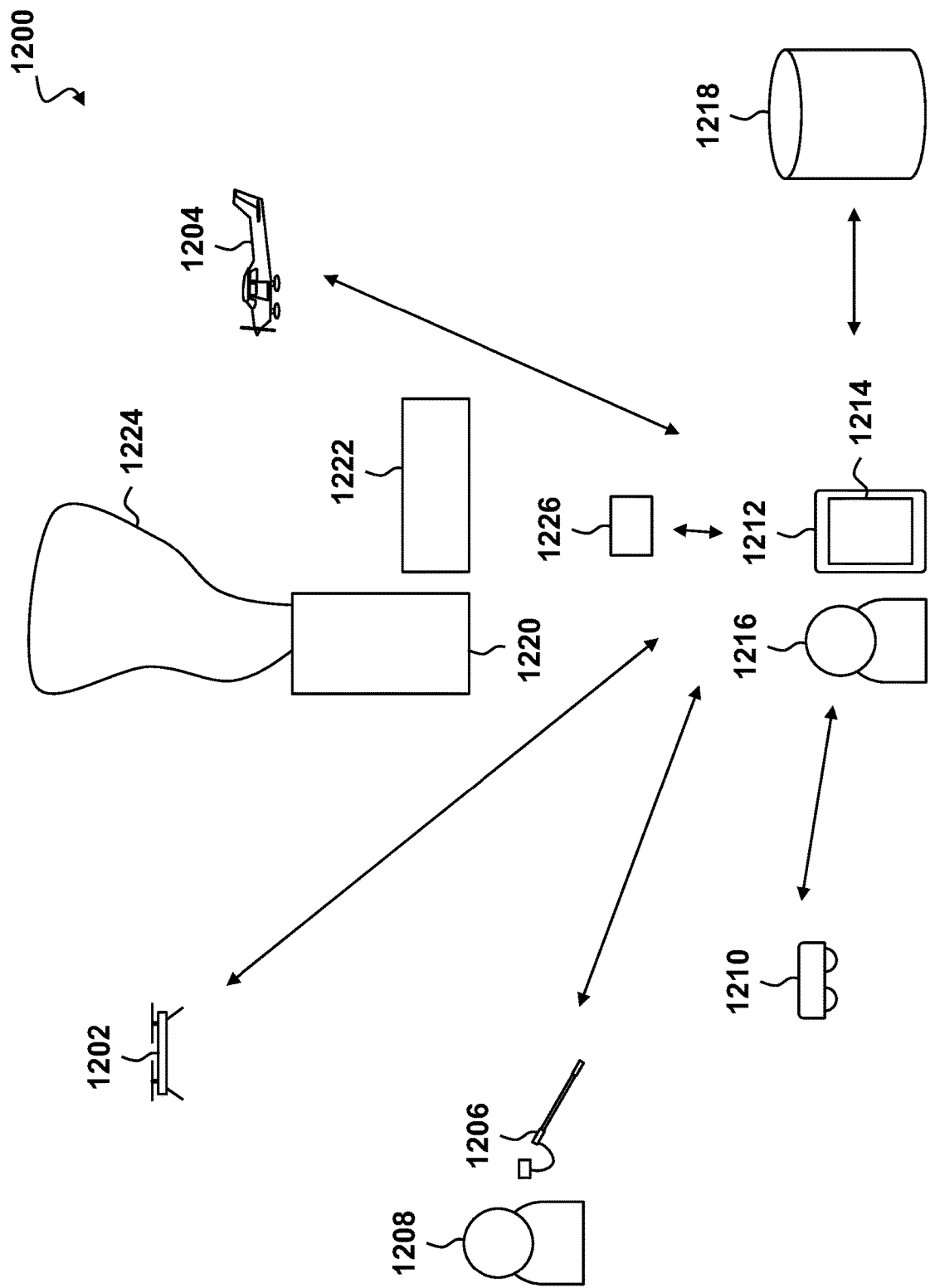
FIG. 12 depicts a system for detecting trace gasses, according to one embodiment.

FIG. 12 depicts a system 1200 for detecting trace gasses, according to one embodiment. The system may include one or more trace gas sensors located in one or more vehicles 1202, 1204, 1206, 1210. The one or more trace gas sensors may detect elevated trace gas concentrations from one or more potential gas sources 1220, 1222, such as a holding tank, pipeline, or the like. The potential gas sources 1220, 1222 may be part of a large facility, a small facility, or any location. The potential gas sources 1220, 1222 may be clustered and/or disposed distal from one another. The one or more trace gas sensors may be used to detect and quantify leaks of toxic gases, e.g., hydrogen disulfide, or environmentally damaging gases, e.g., methane, sulfur dioxide) in a variety of industrial and environmental contexts. Detection and quantification of these leaks are of interest to a variety of industrial operations, such as oil and gas, chemical production, and painting. Detection and quantification of leaks is also of value to environmental regulators for assessing compliance and for mitigating environmental and safety risks. In some embodiments, the at least one trace gas sensor may be configured to detect methane. In other embodiments, the at least one trace gas sensor may be configured to detect sulfur oxide, such as $SO$, $SO_2$, $SO_3$, $S_7O_2$, $S_6O_2$, $S_2O_2$, and the like. A trace gas leak 1224 may be present in a potential gas source 1220. The one or more trace gas sensors may be used to identify the trace gas leak 1224 and/or the source 1220 of the trace gas leak 1224 so that corrective action may be taken.

The one or more vehicles 1202, 1204, 1206, 1210 may include an unmanned aerial vehicle (UAV) 1202, an aerial vehicle 1204, a handheld device 1206, and a ground vehicle 1210. In some embodiments, the UAV 1202 may be a quadcopter or other device capable of hovering, making sharp turns, and the like. In other embodiments, the UAV 1202 may be a winged aerial vehicle capable of extended flight time between missions. The UAV 1202 may be autonomous or semi-autonomous in some embodiments. In other embodiments, the UAV 1202 may be manually controlled by a user. The aerial vehicle 1204 may be a manned vehicle in some embodiments. The handheld device 1206 may be any device having one or more trace gas sensors operated by a user 1208. In one embodiment, the handheld device 1206 may have an extension for keeping the one or more trace gas sensors at a distance from the user 1208. The ground vehicle 1210 may have wheels and/or treads in one embodiment. In other embodiments, the ground vehicle 1210 may be a legged robot. In some embodiments, the ground vehicle 1210 may be used as a base station for one or more UAVs 1202. In some embodiments, one or more aerial devices, such as the UAV 1202, a balloon, or the like, may be tethered to the ground vehicle 1210. In some embodiments, one or more trace gas sensors may be located in one or more stationary monitoring devices 1226. The one or more stationary monitoring devices may be located proximate one or more potential gas sources 1220, 1222. In some embodiments, the one or more stationary monitoring devices may be relocated.

The one or more vehicles 1202, 1204, 1206, 1210 and/or stationary monitoring devices 1226 may transmit data including trace gas data to a ground control station (GCS) 1212. The GCS may include a display 1214 for displaying the trace gas concentrations to a GCS user 1216. The GCS user 1216 may be able to take corrective action if a gas leak 1224 is detected, such as by ordering a repair of the source 1220 of the trace gas leak. The GCS user 1216 may be able to control movement of the one or more vehicles 1202, 1204, 1206, 1210 in order to confirm a presence of a trace gas leak in some embodiments.

In some embodiments, the GCS 1212 may transmit data to a cloud server 1218. In some embodiments, the cloud server 1218 may perform additional processing on the data. In some embodiments, the cloud server 1218 may provide third party data to the GCS 1212, such as wind speed, temperature, pressure, weather data, or the like.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system comprising:
   a processor having addressable memory, wherein the processor is configured to:
   determine one or more flight paths for an aerial vehicle, wherein the determined flight path creates a continuous surface about one or more potential gas sources of a survey site, wherein the processor is further configured to, for creating the continuous surface:
   convert a dataset into an altitude-s space;
   perform a triangulation on the dataset in the altitude s-space; and
   apply the performed triangulation on a Cartesian X, Y, Z space of the dataset to produce at least one of: a fully closed surface and a semi-closed surface;
   receive a trace gas data from one or more trace gas sensors of the aerial vehicle of the continuous surface as the aerial vehicle flies the determined one or more flight paths; and
   determine based on the received trace gas data whether a gas leak is present in the received survey site and a rate of the gas leak if present in the survey site.

2. The system of claim 1, wherein the continuous surface is a flux plane.

3. The system of claim 2, wherein the flux plane is a closed flux plane.

4. The system of claim 1, wherein the continuous surface is formed by any series of turns in the flight path for the aerial vehicle that forms the continuous surface when interpolated.

5. The system of claim 1, wherein the processor is further configured to:
   receive one or more flight platform capabilities of the aerial vehicle, wherein the determined flight path is based on the received one or more flight platform capabilities.

6. The system of claim 5, wherein the processor is further configured to:
   receive a wind data for the survey site, wherein the determined flight path is further based on the received wind data.

7. The system of claim 6, wherein the wind data comprises instantaneous wind speed measurements in three dimensions from an anemometer.

8. The system of claim 1, wherein the aerial vehicle is an unmanned aerial vehicle (UAV).

9. The system of claim 8, wherein the UAV is configured to fly the determined one or more flight paths autonomously.

10. The system of claim 8, wherein the UAV is configured to fly the determined one or more flight paths semi-autonomously.

11. The system of claim 1, wherein the continuous surface comprises a beehive-shaped continuous surface.

12. The system of claim 1, wherein the continuous surface comprises a cone-shaped continuous surface.

13. The system of claim 1, wherein the continuous surface comprises at least one of: a right angle, an arc, and a continuous curve in the flight path for the aerial vehicle.

14. The system of claim 1, wherein the aerial vehicle flies a determined flight path of the one or more flight path two or more times, and wherein the received trace gas data is averaged from each of the two or more flights.

15. A method comprising:
   determining, by the processor, one or more flight paths for an aerial vehicle, wherein the aerial vehicle is an unmanned aerial vehicle (UAV), wherein the determined flight path creates a continuous surface about one or more potential gas sources of a survey site, wherein creating the continuous surface further comprises:
   converting, by the processor, a dataset into an altitude-s space;
   performing, by the processor, a triangulation on the dataset in the altitude s-space; and
   applying, by the processor, the performed triangulation on a Cartesian X, Y, Z space of the dataset to produce at least one of: a fully closed surface and a semi-closed surface;
   receiving, by the processor, a trace gas data from one or more trace gas sensors of the aerial vehicle of the continuous surface as the aerial vehicle flies the determined one or more flight paths; and
   determining, by the processor, based on the received gas data whether a gas leak is present in the received survey site and a rate of the gas leak if present in the survey site.

16. The method of claim 15, wherein the continuous surface is a flux plane.

17. The method of claim 16, wherein the flux plane is a closed flux plane.

18. The method of claim 15, wherein the continuous surface is formed by any series of turns in the flight path for the aerial vehicle that forms the continuous surface when interpolated.

19. The method of claim 15, further comprising:
   receiving, by the processor, one or more flight platform capabilities, wherein the determined flight path is based the received one or more flight platform capabilities.

20. The method of claim 19, further comprising:
   receiving, by the processor, a wind data for the survey site, wherein the determined flight path is further based the received one or more flight platform capabilities, and the received wind data.

21. The method of claim 15, wherein the UAV is configured to fly the determined one or more flight paths autonomously.

22. The method of claim 15, wherein the UAV is configured to fly the determined one or more flight paths semi-autonomously.

* * * * *